US012602734B2

(12) United States Patent
Sideris et al.

(10) Patent No.: US 12,602,734 B2
(45) Date of Patent: Apr. 14, 2026

(54) GRAPHICS PROCESSORS WITH NON-CORRELATED WORKLOAD

(71) Applicant: Arm Limited, Cambridge (GB)

(72) Inventors: Isidoros Sideris, Cambridge (GB);
Tord Kvestad Oygard, Kirkenes (NO);
Per Kristian Kjoll, Trondheim (NO);
Ole Magnus Ruud, Oslo (NO)

(73) Assignee: Arm Limited, Cambridge (GB)

( * ) Notice: Subject to any disclaimer, the term of this patent is extended or adjusted under 35 U.S.C. 154(b) by 208 days.

(21) Appl. No.: 18/262,963

(22) PCT Filed: Feb. 1, 2022

(86) PCT No.: PCT/GB2022/050260
§ 371 (c)(1),
(2) Date: Jul. 26, 2023

(87) PCT Pub. No.: WO2022/162403
PCT Pub. Date: Aug. 4, 2022

(65) Prior Publication Data
US 2024/0311949 A1 Sep. 19, 2024

(30) Foreign Application Priority Data

Feb. 1, 2021 (EP) ..................................... 21386008
Mar. 12, 2021 (GB) ..................................... 2103473

(51) Int. Cl.
*G06T 1/20* (2006.01)
*G06F 9/50* (2006.01)
*G06T 11/40* (2006.01)

(52) U.S. Cl.
CPC ................ *G06T 1/20* (2013.01); *G06F 9/505* (2013.01); *G06T 11/40* (2013.01); *G06T 2210/52* (2013.01)

(58) Field of Classification Search
CPC . G06F 9/505; G06T 1/20; G06T 11/40; G06T 2210/52

(Continued)

(56) References Cited

U.S. PATENT DOCUMENTS 9,009,712 B2 * 4/2015 Schmit .................. G06F 9/5083
718/100
11,688,121 B2 * 6/2023 Rollingson ........... G06T 15/005
345/419

(Continued)

OTHER PUBLICATIONS

International Search Report and Written Opinion, dated Apr. 22, 2022, International Application No. PCT/GB2022/050260.

(Continued)

*Primary Examiner* — Jacinta M Crawford
(74) *Attorney, Agent, or Firm* — Pearl Cohen Zedek Latzer Baratz LLP

(57) ABSTRACT

There is provided a graphics processor (10) comprising a primitive processing circuit operable to process graphics primitives into respective fragment work items to be rendered by a rendering circuit (22). The primitive processing circuit generates one or more queues (18A, 18B) of fragment work items for rendering that contain fragment work items corresponding to multiple, different sources of fragment work items. The graphics processor (10) is configured to issue fragment work items to the rendering circuit (22) in an interleaved fashion such that rendering of fragment work items from a first source of fragment work items can thereby be interleaved with rendering of fragment work items from a second source of fragment work items.

20 Claims, 13 Drawing Sheets

(58) Field of Classification Search
USPC ......................................................... 345/506
See application file for complete search history.

(56) References Cited

U.S. PATENT DOCUMENTS

2013/0265309 A1\*  10/2013  Goel ..................... G06T 15/005
                                                          345/426
2019/0066360 A1\*  2/2019   Jiao ........................ H04L 1/0071
2019/0088009 A1    3/2019   Forey et al.

OTHER PUBLICATIONS

Combined Search and Examination Report under Sections 17 and 18(3), dated Nov. 29, 2021, GB Patent Application No. GB2103473. 1.

Chen, Jiawen et al., "A reconfigurable architecture for load-balanced rendering", Graphics Hardware, ACM 2 Penn Plaza, Suite 701 New York, NY, Jul. 30, 2005, pp. 71-80, ZP058225260.

Eldridge, Mattew et al., Pomegranate: A Fully Scalable Graphics Architecture, ACM SIGGRAPH 2000, New Orleans, Louisiana, Jul. 23-28, 2000, pp. 443-454.

\* cited by examiner

Subtile 0 ¦ Subtile 1

Current subtile i=0 — 70

Finished? — 71

Yes

No

Queue i busy? — 72

Yes

No

Process a primitive from subtile i — 73

Insert quads in queue i — 74

Current subtile i=next() — 75

GRAPHICS PROCESSORS WITH NON-CORRELATED WORKLOAD

BACKGROUND

The technology described herein relates to the operation of graphics processors, and in particular to the processing of fragment workloads within such graphics processors.

Graphics processing is normally carried out by first dividing the graphics processing (render) output to be rendered, such as a frame to be displayed, into a number of similar basic components (so-called graphics "primitives") to allow the graphics processing operations to be more easily carried out. These "primitives" are usually in the form of simple polygons, such as triangles.

The primitives can be processed by the graphics processing system, in order to generate the desired graphics processing output (render output), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive. The rendering process then derives the data, such as red, green and blue (RGB) colour values and an "Alpha" (transparency) value, necessary to represent the primitive at the sample points (i.e. "shades" each sample point). This can involve, for example, applying textures, blending sample point data values, etc. (The term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

A "fragment" is therefore effectively (has associated with it) a set of primitive data as interpolated to a given output space sample point or points of a primitive. It may also include per-primitive and other state data that is required to shade the primitive at the sample point (fragment position) in question.

Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

The actual rendering of the fragments may be performed using a programmable processing stage, commonly referred to as a fragment (pixel) "shader". The fragment shader is a programmable processing stage that executes shader programs on input data values to generate a desired set of output data, such as appropriately shaded and rendered fragment data in the case of a fragment shader, for processing by the rest of the graphics processing pipeline and/or for output.

A graphics processor shader core is thus a processing unit that performs processing by running (typically small) programs for each "work item" in an output to be generated. When generating a graphics output, such as a render target, such as a frame to be displayed, a "work item" in this regard is usually a set of one or more vertex or sampling position in the case of a fragment shader.

In graphics processor shader operation, each work "item" will be processed by means of an execution thread which will execute the instructions in the shader program in question for the work item in question.

In order to execute shader programs, a graphics processor will include an appropriate execution unit or units (circuit or circuits) for that purpose. The execution unit(s) will include programmable processing circuit(s) for executing shader programs (the "shaders" of the graphics processing pipeline).

The actual data processing operations that are performed by the shader execution unit when executing that shader program are usually performed by respective functional units (circuits), such as arithmetic units (circuits), of the execution unit, in response to, and under the control of, the instructions in the (shader) program being executed. Thus, for example, appropriate functional units, such as arithmetic units, will perform data processing operations in response to and as required by instructions in a (shader) program being executed.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically sub-divided (by area) into regularly-sized and shaped tiles (they are usually e.g., squares or rectangles).

To generate a given render output (or region thereof) the graphics processor works through all of the tiles to be rendered for the render output (region) in question, with the respective sequence(s) of primitives to be rendered for each rendering tile (processing task) being passed into the graphics processing pipeline, and rendered, in turn.

The rendered tiles are then recombined to provide the complete render output (e.g. a frame, or a portion of a frame, for display).

Once all of the tiles for a given render output (region) have been rendered, the generation of that render output is then complete, and the graphics processor may then move on to the next processing job, e.g., to start generating a different render output.

The Applicants believe that there is scope for improved mechanisms for processing fragment workloads within graphics processors.

BRIEF DESCRIPTION OF THE DRAWINGS

Various embodiments will now be described with reference to the accompanying drawings in which.

DESCRIPTION

Figure 1:
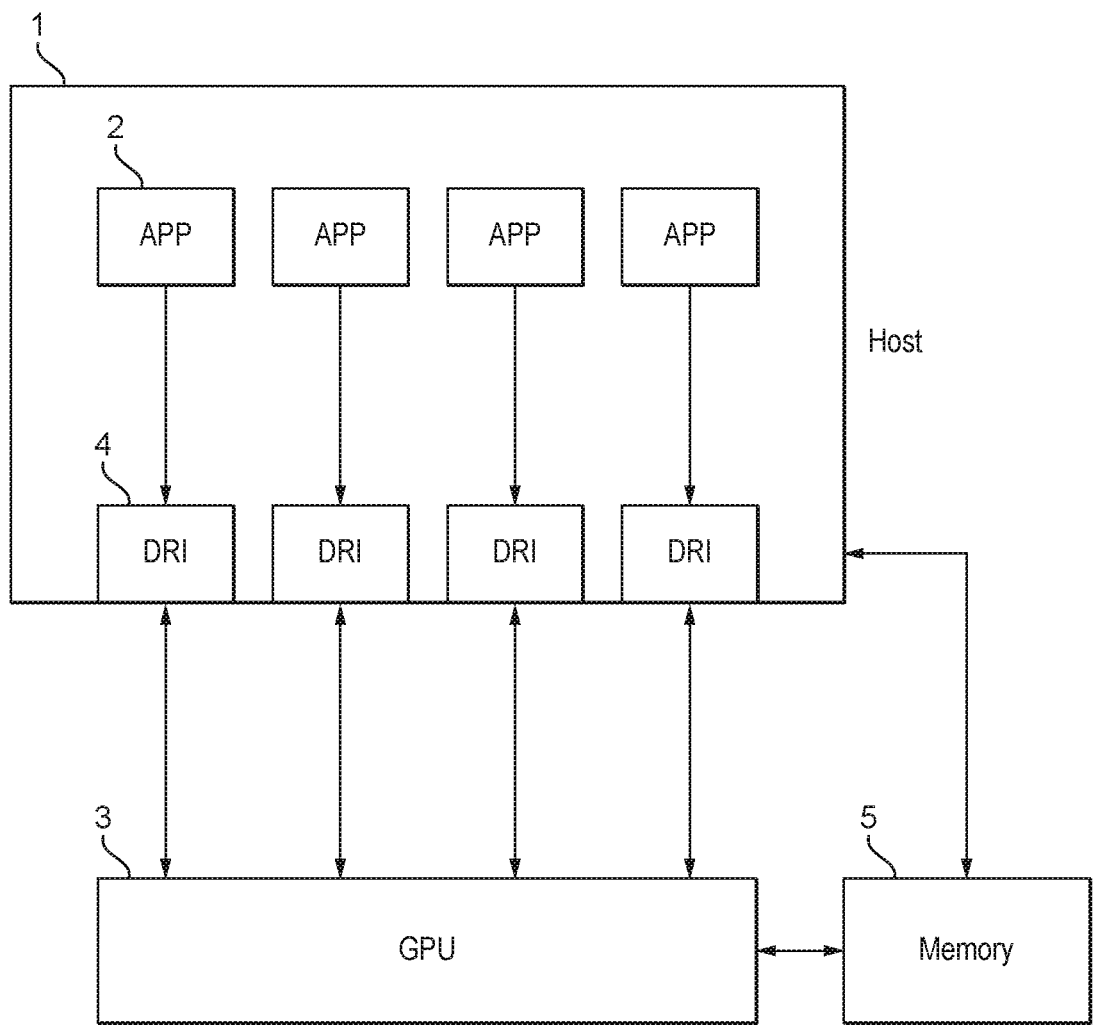
FIG. 1 shows schematically a graphics processing system within which an embodiment can be performed.

A first embodiment of the technology described herein comprises a graphics processor comprising:

a primitive processing circuit operable to process graphics primitives into respective fragment work items to be rendered, wherein the primitive processing circuit is configured to generate one or more queues of fragment work items for rendering, wherein the one or more queues of fragment work items contain fragment work items corresponding to multiple, different sources of fragment work items; and

a rendering circuit for rendering respective fragment work items generated by the primitive processing circuit, wherein the graphics processor is configured to issue fragment work items from the one or more queues of fragment work items generated by the primitive processing circuit to the rendering circuit for rendering so that fragment work items from the different sources of fragment work items can be issued to the rendering circuit in an interleaved fashion, wherein rendering of fragment work items from a first source of fragment work items can thereby be interleaved with rendering of fragment work items from a second source of fragment work items.

A second embodiment of the technology described herein comprises a method of operating a graphics processor, the graphics processor comprising:

a primitive processing circuit operable to process graphics primitives into respective sets of graphics fragments to be rendered; and a rendering circuit for rendering respective fragment work items provided by the primitive processing circuit;

the method comprising:

the primitive processing circuit generating one or more queues of fragment work items for rendering, wherein the one or more queues of fragment work items contain fragment work items corresponding to multiple, different sources of fragment work items; and the graphics processor issuing fragment work items from the one or more queues of fragment work items generated by the primitive processing circuit to the rendering circuit for rendering so that fragment work items from the different sources of fragment work items are issued to the rendering circuit in an interleaved fashion, whereby rendering of fragment work items from a first source of fragment work items is thereby interleaved with rendering of fragment work items from a second source of fragment work items.

The technology described herein relates to graphics processors that are operable to generate render outputs (which may, e.g., represent a frame, e.g. for display, or any other suitable output that a graphics processor may generate) by processing a sequence of graphics primitives that has been specified for the render output into respective sets of one or more graphics fragments for rendering, which graphics fragments are then rendered to generate the desired outputs (e.g. frames).

The rendering itself may be performed either for individual fragments or for groups of plural fragments (e.g. a group of 2×2 graphics fragments, a 'quad'). The rendering may thus in general be performed in respect of fragment work "items", with each fragment work items corresponding to a set of one or more graphics fragments.

The graphics processor of the technology described herein thus comprises a primitive processing circuit that performs the initial processing (e.g. primitive assembly, rasterisation, etc.) of the input graphics primitives into respective sets of graphics fragments as well as a rendering circuit (e.g. a fragment shader) that performs the actual rendering of the graphics fragments (fragment work items) provided by the primitive processing circuit for the render output.

In the technology described herein the graphics processor is configured to interleave processing (rendering) work for multiple, different "sources" of graphics fragments (fragment work items) (which different "sources" may, e.g., and in embodiments do, correspond to different regions (e.g. different rendering tiles, or sub-divisions of such tiles ('sub-tiles')) of the same render output, but may also correspond, e.g., to different render outputs, or other suitable "sources" of fragment work items), such that fragment work items from at least first and second different sources of fragment work items are issued to the rendering circuit for rendering in an "interleaved" fashion.

For example, the graphics processor may be (and in an embodiment is) configured to repeatedly alternate (or switch) between issuing fragment work items to the rendering circuit for rendering from multiple, different sources of fragment work items. Thus, the graphics processor may be arranged to first issue a set of fragment work items from the first source of graphics fragments, and then, before the rendering for the first source is complete (such that there are still fragment work items for the first source to be issued), issue a set of fragment work items from the second source of graphics fragments. Then, before the rendering for the second source of graphics fragments is complete, the graphics processor can then return to issuing fragment work items from the first source of graphics fragments, and so on, whereby fragment work items from the first and second sources of graphics fragments are issued in an interleaved, e.g. alternating, fashion.

The graphics processor may be configured to alternate (switch) between sources in a predetermined fashion, e.g. such that it is configured to issue a set, e.g., fixed, number of fragment work items from a first source, before switching to the next source, etc., or may be configured to switch in a more dynamic fashion. Various arrangements are contemplated in this regard, as will be explained further below.

In particular, the technology described herein recognises that by interleaving fragment processing workloads from multiple, different sources of graphics fragments (fragment work items), it is possible to provide the rendering circuit with a more uniform workload, such that the rendering circuit may be used in a more 'balanced' manner.

As will be explained further below, in this way, the technology described herein may provide a more efficient utilisation of the available rendering resource, at least on average, and may therefore reduce the overall time to render.

In this regard, the technology described herein has recognised that the fragment processing (rendering) workload, e.g., for a given "source" of fragment work items, may often contain a number of discrete 'phases' of work.

For example, in a tile-based graphics processor, a typical processing workload for a set of fragments for a single tile may include a first phase of work that comprises, e.g., a number of texturing operations (such as varying interpolations, texture loading, etc.). This first phase of work may then be followed by a second or further phase of work that comprises, e.g., a number of arithmetic operations (e.g., using the loaded textures). These phases of work may then be repeated, e.g. for each new set of fragment work items issued for rendering (and, e.g., also for each new tile).

Furthermore, there may be various synchronisation events within the fragment processing workload for a given fragment work item, e.g. due to various processing dependencies between the processing operations (phases of work), that makes the fragment processing workload highly serialised. For example, where the first phase of work corresponds to a set of texturing operations, e.g. for loading a set of working data, the second or further phase of work using the set of working data may typically not be performed until the first phase of work has finished, and there may be various processing barriers within the workload to control these dependencies.

In general, the fragment processing (rendering) workload may therefore contain various processing boundaries (such as tile boundaries, in a tile-based graphics processor), and/or barriers, that, at least when the graphics processor is operated in a more conventional manner, e.g. with a plurality of tiles being rendered one after another to generate a render output, act as 'serialisation' points, where the workload may be synchronised, e.g. such that there may (initially) be a large number of texturing operations to perform at the same time, for example, and wherein the next phase of work cannot start until these have finished. This means that the fragment processing workload may be highly serialised.

The technology described herein recognises that the typically serialised nature of the fragment processing workload means that, in more conventional graphics processors, the fragment processing (rendering) workload may exhibit a 'bunching' effect around such serialisation points. For instance, the overall fragment processing (rendering) workload may contain certain, distinct processing peaks, e.g. where some of the functional units of the rendering circuit are busy, e.g. performing a respective set of texturing operations, but other functional units of the rendering circuit are idle.

For example, the rendering circuit may typically, and in an embodiment does, comprise a plurality of functional units that are arranged for performing respective, different types of processing operations. The rendering circuit may therefore typically, and in the technology described herein in an embodiment does, include a plurality of different types of functional units that are arranged, and in an embodiment dedicated, for performing respective, different operations. Thus, there may be, and in an embodiment is, (at least) a first set of functional units that are arranged for performing texturing operations (texture processing units) and a second set of functional units that are arranged for performing arithmetic operations (arithmetic processing units).

In more conventional graphics processor operation, where the fragment processing workload is performed in a more serialised manner, there may therefore be instances, e.g. when the workload currently involves a 'texture-heavy' phase, where the rendering circuit is primarily busy performing a number of texturing operations, such that (all of) the texture processing units may in that instant be fully utilised (the workload thus exhibiting a texture 'peak'), but where the arithmetic processing units are idle for an extended number of cycles, e.g. waiting on the texturing operations to finish.

Similarly, when the workload is 'arithmetic-heavy', there may be instances where the arithmetic processing units are busy (an arithmetic 'peak'), but wherein at least some of the texture processing units are idle.

Thus, the serialised nature of the typical fragment processing workload means that there may be instances where a large number of fragment work items need to undergo the same type of operations at substantially the same time, and the fragment processing workload cannot move on until these operations are complete. This then means that when part of the rendering circuit is busy performing a first phase of processing work, another part of the rendering circuit may not be able to be used until the first phase of processing work is finished, and so that part of the rendering circuit may be forced to be idle.

Increasing the throughput of the functional units can improve the speed of the respective operations, e.g. so that the various texture or arithmetic peaks can themselves be finished more quickly, and this may provide some speedup, but with the associated cost (e.g. in terms of area) of achieving the increased throughput of the functional units. Furthermore, this does nothing to address the bunching effect described above, and the average utilisation of the (overall) rendering circuit is still poor, such that there may still be extended periods between processing peaks where some of the functional units are caused to be idle.

The technology described herein recognises that this may be a relatively inefficient use of the available rendering resource, and that by providing a more uniform (overall) fragment processing workload to the rendering circuit it may be possible to better utilise the available rendering resource, e.g. to reduce instances of functional units being idle, and hence speedup the rendering.

Thus, in the technology described herein, in contrast to the more conventional graphics processor operation described above, fragment processing work for multiple, different "sources" of fragment work items can be (and is) interleaved. In this way the graphics processor is in an embodiment configured to provide a more uniform workload to the rendering circuit, and to thereby provide a better utilisation of the available rendering resource, at least on average.

In particular, by interleaving processing work from different sources of fragment work items in this way, it is possible to reduce instances where some of the functional units are forced to be idle.

For instance, when generating a render output, the graphics processor may need to render fragment work items from a plurality of different "sources" of fragment work items, e.g., which may, e.g., and in some embodiments do, correspond to different regions (e.g. tiles) into which the render output has been divided, e.g., for rendering purposes.

The fragment processing workloads for different regions of the render output (e.g. different tiles, or other such regions into which the render output has been divided) may be substantially independent. However, the fragment processing workloads for the different regions of the render output may nonetheless typically be expected to exhibit similar (correlation) characteristics, e.g. since there are often synchronisation events, e.g., at the (tile) boundaries between the different regions that make this the case. For example, for each new region (e.g. tile) that needs to be rendered, the processing workload may start with a first phase of, e.g., texturing operations, following by a second or further phase of, e.g., arithmetic operations, etc., as described above.

The technology described herein thus recognises that fragment processing workloads for different sources of graphics fragments (e.g. different regions of the render output) may often be expected to involve substantially the same phases of work. This means that the respective fragment processing workload for each respective source (e.g. region of the render output) may show similar (correlation) characteristics, e.g. such that if the fragment processing workloads were started at the same time, the overall fragment processing workload would still be substantially correlated, and the 'bunching' effect described above would still occur.

Thus, by interleaving fragment work items from different sources of fragment work items, it is possible to provide the rendering circuit with a less correlated overall fragment processing workload. That is, even when the different sources of fragment work items are expected to show similar (correlation) characteristics (phases of work), by simply interleaving fragment work items from the different sources in the manner of the technology described herein, it is possible to make the overall fragment processing workload more uniform, e.g., and in particular, by causing the individual fragment workloads for the respective sources to be processed 'out of phase' with each other, to provide a more balanced overall workload. In this way the 'bunching' effect described above can be reduced (and in an embodiment substantially avoided).

For instance, by interleaving the processing of fragment work items from multiple, different sources of fragment work items, it is possible to effectively delay the start of the fragment processing workload for one of the sources relative to the other (or another one of the) sources. The effect of this is that, even when (and especially when) the fragment processing workloads for the individual sources would be expected to be highly correlated, the overall fragment processing workload can be made less correlated, e.g., and in an embodiment, substantially uniform.

For example, the effect of this may be that when a first set of (e.g.) texturing processing units are busy performing a first phase of texturing work for a first source of fragment work items, the other (e.g.) arithmetic processing units may be performing for a second source of fragment work items, and so on. Thus, by interleaving fragment work items from different sources of fragment work items to try to provide a more balanced workload, the technology described herein can reduce instances of any of the functional units being idle, and may therefore provide a better average utilisation of the available rendering resource, which in turn can reduce the overall processing time.

Thus, the technology described herein may provide various benefits compared to existing approaches.

The technology described herein can be used in and with any suitable and desired graphics processing system and processor. Correspondingly, the graphics processor of the technology described herein can be used for any form of output that a graphics processing system may be used to generate.

The graphics processor may thus be operated to generate any suitable and desired render outputs. The render output that is generated may, for example, comprise (at least a part of) a frame for display. For instance, the render output may comprise a (full) frame, or some other desired rendering unit, e.g. a draw call, for the frame. In general, the technology described herein can be used for all forms of output that a graphics processor may be used to generate, such as frames for display, render-to-texture outputs, etc.

Moreover, the graphics processor can equally be used for any other suitable processing and operations and outputs, for example that may not be or may not relate to a display or images. For instance, the technology described herein can be used for any desired graphics processor data processing operations, such as GPGPU (general purpose GPU) operations, such as compute shading, etc.

The technology described herein is particularly suitable for use with tiled renderers (tile-based graphics processing systems). Thus, in an embodiment, the graphics processor (processing pipeline) is a tiled-based graphics processor (processing pipeline).

The processing of the primitives into the respective sets of fragments (fragment work items) may be performed in any suitable fashion, as desired. For example, and in an embodiments, the processing is performed in a pipelined fashion, e.g. with the primitive first being subject to any desired primitive assembly operations (including vertex shading, etc.) and the assembled primitives then being rasterised into respective sets of one or more graphics fragments (fragment work items). At this point various fragment work items may be culled (e.g. for hidden surface removal).

Any remaining fragment work items that survive the primitive processing can then be issued to the rendering circuit for rendering.

The rendering is then completed by shading the fragment work items generated from the primitive to generate respective rendered fragment data for the render output.

In general, any suitable and desired rendering technique may be used. For example, the rendering need not involve a rasterisation-based technique but may also employ other suitable techniques, including, but not limited to, ray-tracing or hybrid ray-tracing rendering techniques.

The rendering itself may be performed in any suitable and desired fashion. Correspondingly, the rendering circuit may comprise any suitable rendering circuit that can be operated in the manner of the technology described herein.

The renderer (renderer circuit) of the graphics processor should be operable to render (shade) graphics fragments it receives to generate the desired output graphics fragment data. It may contain any suitable and desired rendering elements and may be configured in any suitable and desired manner.

In an embodiment, the rendering circuit comprises a fragment shader (a shader pipeline) (i.e. a programmable processing circuit that is operable to and that can be programmed to carry out fragment shading programs on fragment work items in order to render them).

Thus, as will be explained further below, the rendering circuit in an embodiment comprises a programmable execution unit operable to execute fragment shader programs, and in which when executing a fragment shader program, the programmable execution unit executes the fragment shader program for respective execution threads corresponding to respective fragment work items of the (or a) render output being generated. In that case, each fragment work item may be, and in an embodiment is, processed by means of an execution thread, or group of plural execution threads (e.g. four in the case of a 'quad') which will execute the instructions in a shader program for the fragment work "item" in question.

According to the technology described herein the graphics processor is configured to generate one or more queue(s) of fragment work items for rendering. Each queue may thus contain a sequence of fragment work "items" that can be (and are) issued to the rendering circuit for rendering, as will be explained further below. Each fragment work item may, for example, correspond to a respective (single) graphics fragments or to a set of plural graphics fragments (e.g. a 2×2 set of graphics fragments, a 'quad'), with each graphics fragment corresponding in turn to one or more sampling position for the respective render output. However, the fragment work items may generally correspond to any other arrangement of graphics fragments in a suitable and desired format for issuing to the rendering circuit.

The fragment work items may be inserted directly into the queues (as fragment work items). However, it would also be possible for the fragment work items to be subject to further processing, and then queued in that form. For example, in an embodiment, where the rendering circuit comprises a programmable execution unit operable to execute fragment shader programs, and in which when executing a fragment shader program, the programmable execution unit executes the fragment shader program for respective execution threads corresponding to respective fragment work items of the (or a) render output being generated, the queues of fragment work items may correspond to queues of execution thread groups spawned for the fragment work items. Various arrangements would be possible in this regard.

In the technology described herein, the one or more queue(s) of fragment work items that are generated by the graphics processor contain fragment work items corresponding to multiple, different "sources" of graphics fragments (such that graphics fragment work items from the different sources can then be issued to the rendering circuit for rendering in an interleaved fashion).

There may be multiple (e.g., and in an embodiment, two) queues of fragment work items, each corresponding to a respective (and different) source of fragment work items, or there may be a single queue of fragment work items that includes fragment work items from multiple different sources of fragment work items. Various arrangements and combinations of these approaches would be possible.

In general, the different sources of graphics fragments may be any suitable, different sources of graphics fragments.

The different sources of graphics fragments should be, and in an embodiment are, substantially independent sources of graphics fragments, e.g. such that fragment processing workloads for the different sources can be scheduled, and interleaved, as desired, e.g. without having to account for any processing dependencies between the (interleaved) sources.

The different sources of graphics fragments may also contain, or at least be expected to contain, similar phases of work. Thus, if the fragment processing workloads for the different sources were started at the same time, the two fragment processing workloads may be expected to show similar, correlated behaviour.

In the technology described herein, even where the individual fragment workloads for the different sources are expected to contain similar phases of work, by suitably interleaving the fragment processing workloads, it is possible to effectively shift the fragment processing workload for one source relative to the other to therefore reduce any expected correlations, and therefore provide a more uniform overall workload.

In some embodiments, the different sources of graphics fragments correspond to different (rendering) tiles within the same (single) render output.

For instance, as discussed above, the technology described herein recognises that typical fragment processing workloads for different tiles may be expected to show substantially similar characteristics (phases of work), e.g. due to synchronisation events at the start of each tile.

This means that interleaving fragment processing work from different tiles, such that the processing workload for one tile is effectively delayed relative to the other, it is possible to provide a more uniform average workload.

However, other arrangements would of course be possible. For instance, the different sources of graphics fragments need not correspond to different (rendering) tiles, but may correspond to any other suitable sub-divisions of a render output that is being generated.

For example, in some embodiments, the render output that is being generated may itself correspond to a single tile, and in that case the different sources of graphics fragments may, e.g., correspond to suitable sub-divisions of the tile (sub-tiles).

Thus, in embodiments, the different sources of fragment work items correspond to different regions of a render output that is being generated.

In that case the different sources of fragment work items may correspond to any suitable regions into which the render output has been divided, which regions may therefore, e.g., correspond to rendering tiles, or suitable sub-divisions of rendering tiles (sub-tiles), etc.

Thus, in embodiments, the graphics processor is a tile-based graphics processor, and wherein the different sources of fragment work items correspond to different tiles, or different sub-divisions of tiles, into which the render output has been divided for rendering purposes.

In other embodiments, the different sources of graphics fragments need not correspond to different regions of the same render output. For example, in some embodiments, the different sources of graphics fragments may correspond to different respective render outputs (different processing jobs), e.g., and in an embodiment, that are expected to be substantially independent of each other.

Various other arrangements would be possible and in general the different sources of graphics fragments that are handled in the manner of the technology described herein can be any suitable sources of fragment work items, e.g., that can be interleaved in the manner described herein to provide a less correlated overall workload.

The graphics processor (primitive processing circuit) may be configured to generate the one or more queue(s) of fragment work items in any suitable fashion, as desired.

For example, in one embodiment, the graphics processor (primitive processing circuit) is configured to generate plural queues of fragment work items for rendering, each queue corresponding to one or more respective sources of fragment work items. For example, in an embodiment, the graphics processor may generate and maintain (at least) two separate queues of fragment work items, with each queue corresponding to (at least) one respective and different source of fragment work items.

Where there are multiple queues of fragment work items, each corresponding to a different source of fragment work items, the graphics processor may split the processing for the different sources of fragment work items at any suitable stage during the (primitive) processing.

In some embodiments, the primitives from each of the different sources are processed in a serial fashion, e.g. using the same primitive processing pipeline (e.g. the same rasteriser), and the sets of graphics fragments resulting from the primitive processing are then issued into different, respective queues at the end of the primitive processing circuit, e.g. after all of the desired processing of the primitives into sets of graphics fragments is completed. This may be desirable, to save having to maintain parallel primitive processing pipelines, e.g. to save area.

Thus, in embodiments, the primitive processing circuit is configured to process input primitives into respective sets of fragment work items in a serial fashion, and wherein the graphics processor is configured to interleave the processing of primitives from the multiple different sources of fragment work items in the primitive processing circuit, with the resulting fragment work items generated by the primitive processing then being inserted into the one or more queues of fragment work items.

In this case, the primitive processing circuit may be configured to interleave primitive processing for the different sources of fragment work items. For example, a :fragment" frontend endpoint may be arranged to alternately issue sets of one or more primitives (e.g. draw calls) from the different sources of fragment work items into the primitive processing circuit, such that the primitive processing is performed in an interleaved manner, in order to alternately populate the queue(s) with fragment work items from the different sources.

For example, a first set of one or more primitives for a first source of fragment work items may be processed into a respective set of fragment work items, which are then inserted into an appropriate queue associated with that source of fragment work items, followed by a second set of one or more primitives for a second source of fragment work items, and so on.

In this way the primitive processing circuit is configured to interleave primitive processing for different sources, such that the respective fragment work items for the different sources can be queued appropriately, but the primitives for the different sources pass through the same primitive processing circuit (pipeline).

However, this need not be the case, and in some cases it may be desirable to split the processing of primitives/fragments at an earlier stage in the primitive processing circuit (pipeline), e.g. such that at least some of the primitive/fragment processing that is performed prior to the actual rendering of the fragment work items is performed in parallel for the different sources of fragment work items.

For example, in some cases, where the generated fragment work items are then subject to one or more fragment culling operations, such as early depth and/or stencil testing, the early depth and/or stencil testing may be performed separately, and in parallel, for the different sources of fragment work items, e.g. such that the different queues of fragment work items are generated between the (e.g.) rasterisation circuit and such fragment culling operations. In that case, the primitives for different sources may be rasterised, etc., in an interleaved manner, using the same primitive processing circuitry, up to that point, but separate fragment culling may be performed for the different sources of fragment work items.

As another example, the primitive processing circuit may be configured to process primitives for the different sources entirely in parallel, e.g. such that there is a separate, respective rasterisation circuit, etc., for each different source of primitives, which feeds a respective separate queue of fragment work items.

Various arrangements would be possible in this regard, and in general the primitive/fragment processing may be split at any point prior to the rendering circuit in order to generate multiple queues of fragment work items.

Moreover, in some embodiments rather than generating multiple queues corresponding to different sources, the graphics processor may generate a single queue containing fragment work items from multiple, different sources. For example, at least where the primitive processing is performed in an interleaved fashion, the resulting fragments generated for each source could simply be inserted into a single queue, in the (interleaved) order in which they were generated. In that case, the queue may naturally include an interleaved sequence of fragment work items from the different sources, due to the serialised (pipelined) nature of the primitive processing.

In that case the fragment work items included into the queue are in an embodiment stored with a suitable identifier indicating the source of graphics fragments to which the fragment work items relate. In some embodiments, this then also allows the graphics processor to select from the different sources appropriately, e.g. by searching the queue, as will be explained further below.

In the technology described herein, however the queue(s) are populated with fragment work items from the different sources of fragment work item, the graphics processor is configured to interleave fragment processing for the different sources of fragments.

In particular, this is done such that fragment work items are issued to the rendering circuit for rendering in an interleaved fashion, e.g. such that a set of one or more fragment work items for a first source of graphics fragments are rendered, followed by a set of one or more fragment work items for a second source of graphics fragments, and then followed by another set of one or more fragment work items for the first source of graphics fragments, and so on.

Thus, in embodiments, the graphics processor is configured to repeatedly switch back and forth between different sources of fragment work items, such that at least some fragment work items from a second source of fragment work items are issued before all of the fragment work items from a first source of fragment work items are finished, and so on.

In order to select from the different sources of graphics fragments, the graphics processor in an embodiment further comprises a selection circuit for selecting sets of graphics fragments to be issued to the rendering circuit. The control as to which fragment work items (from which source of graphics fragments) are issued for rendering can be performed in any suitable manner, as desired.

For example, in some embodiments, the selection between the different sources of graphics fragments is performed in a manner that is substantially independent of the current workload and/or the current state of the rendering circuit. Thus, in embodiments, the graphics processor may be configured to repeatedly alternate (switch) between the different sources of graphics fragments in a predetermined fashion.

For example, in one embodiment, the graphics processor (primitive processing circuit) is configured to generate plural queues of graphics fragments for rendering, each queue corresponding to one or more respective sources of graphics fragments. For example, in an embodiment, the graphics processor may generate and maintain (at least) two separate queues of graphics fragments, with each queue corresponding to (at least) one respective source of graphics fragments.

In that case, the graphics processor (the selection circuit) may be configured to alternately issue fragment work items from the different sources of graphics fragments (the different queues), e.g., and in an embodiment, in a round-robin fashion, such that a set of fragment work items from a first source (queue) are issued followed by a set of fragment work items from a second source (queue), and so on.

This could also be done with a single queue of fragment work items that contains fragment work items from a plurality of different sources of fragment work items, e.g. where the fragment work items are inserted into the queue in an interleaved manner, e.g. according to the desired, predetermined scheduling. In that case, the graphics processor can simply issue fragment work items from the queue in the order in which they were queued, and in this way the graphics processor will naturally interleave fragment work items from the different sources as a result of how the fragment work items were inserted into the queue.

In an embodiment, the graphics processor (selection circuit) may be configured to alternately issue fragment work items from the different sources of graphics fragments on a per draw call basis, e.g., and in an embodiment, such that after the fragment work items for a first set of one or more draw calls is issued for a first source, the fragment work items corresponding to the first set of one or more draw calls is then issued for a second source, followed by the fragment work items for a second set of one or more draw calls for the first source, and then the second set of draw calls for the second source, and so on.

However, other arrangements would be possible. For example, it would also be possible to simply issue a set, e.g. fixed, number of fragment work items from each source. Thus, in other embodiments, the graphics processor (selection circuit) may be configured to alternately issue fragment work items from the different sources of graphics fragments after a predetermined number of cycles, e.g., and in an embodiment, such that a set of fragments from one queue is issued in a first number of cycles, and then in the next number of cycles a set of fragments from another (the next) queue is issued, and so on.

Thus, in some embodiments, there is no dynamic control of which fragment work items (from which source) are issued for rendering, and the graphics processor is configured to issue fragment work items from the different sources according to a predetermined schedule, e.g. without attempting to monitor the current workload and/or the current state of the rendering circuit. This may nonetheless still provide an improvement by reducing any (expected) correlation in the overall fragment processing workload.

In some other embodiments, rather than interleaving work, e.g. on a per primitive or per draw call basis, the graphics processor may be configured to continually issue work from one source until a certain threshold is satisfied, at which point the graphics processor may then switch to the other source. Various arrangements would be possible in this regard.

In some embodiments, the interleaving of the fragment processing (rendering) work can be performed in a more intelligent fashion. For example, in some embodiments, the graphics processor may be arranged to monitor the current state of the rendering circuit, and/or one or more other conditions within the graphics processor, during runtime, and to control which fragment work items are issued based on such runtime monitoring, e.g. to try to provide a more optimised workload, e.g. as will be explained further below.

For example, in some embodiments, where the graphics processor is configured to generate plural queues, each corresponding to a different source of graphics fragments, the graphics processor may be arranged to at least monitor the current state of the queues, e.g. to determine whether the queues are progressing, and to switch between the different queues on this basis. For example, when it is determined that a queue of fragment work items is not progressing, the graphics processor may be controlled to start issuing fragment work items from another queue.

To track whether a queue is progressing, the graphics processor may, for example, track the number of fragment work items in the queue, and when the number of fragment work items in the queue exceeds a threshold, or exceeds the number of fragment work items in the other queue, the graphics processor may then be caused to start issuing work items from that queue. Various other arrangements would be possible in this regard and the tracking of whether, and which of, the queues are currently 'busy', e.g. not progressing, can be performed in any suitable fashion, as desired.

For example, the graphics processor may be arranged to issue a set of primitives (e.g. a draw call) for a first source of graphics fragments to the primitive processing circuit for processing into respective sets of fragments, which are then inserted into the respective queue for the first source. The graphics processor may then issue a corresponding set of primitives (e.g. a corresponding draw call) for a second source of graphics fragments to the primitive processing circuit for processing into respective sets of fragments, which are then inserted into the respective queue for the second source.

However, in embodiments, before issuing a set of primitives into the primitive processing circuit for the source in question, the graphics processor may be arranged to check whether the respective queue for that source is progressing, or not. When it is determined that the queue is not progressing, the graphics processor may then switch to the other source without issuing any primitives.

In that case, the graphics processor may interleave processing for the different sources, e.g. on a per primitive or per draw call basis, so long as the queues are currently progressing. In this way can monitor back pressure resulting from the queues, and schedule work accordingly.

In a similar fashion, instead of (or as well as) monitoring back pressure from the queue(s) themselves, the graphics processor may monitor one or more other conditions that may be indicative of whether the workloads for the respective sources of fragment work items are suitably progressing. For instance, another possible measure of whether the fragment workloads for the different sources is progressing would be the effectiveness of (early) fragment culling/ hidden surface removal operations. For example, the fragment culling/hidden surface removal operations take rendered fragment work items as input. If the fragment workload is not progressing the fragment culling/hidden surface removal operations may therefore be starved of rendered fragment work items, and will not therefore be able to cull the later fragment work items in an efficient manner.

Thus, if there is very little (early) fragment culling/hidden surface removal in respect of a given source of fragment work items this might indicate that fragment work items from that source are not progressing through the rendering circuit. In that case, it may be desirable to switch to issuing fragment work items from another source, and in embodiments therefore this is done. Thus, in embodiments, the graphics processor is configured to track one or more conditions that are indicative of the efficiency of fragment culling operations such as early depth and/or stencil testing, etc., and to select between the sources accordingly. For example, this may be done by tracking a threshold based on the number of fragment work items from each source that are being culled, and when this number falls below a threshold for a given source of fragment work items, the graphics processor can determine that it should start issuing fragment work items from that source.

It will be appreciated that similar runtime monitoring may be performed to any other such operations that may be indicative of the progress of the respective fragment workloads. For example, another measure of this might be cache behaviour. Thus, various other arrangements are possible for monitoring the progress of the queue(s) for the different sources of fragment work items, and for selecting (switching) between the sources of fragment work items appropriately to try to ensure the rendering circuit receives a more balanced overall fragment processing workload.

In addition, or alternatively, to this, it would be possible to perform runtime monitoring of the rendering circuit itself, e.g. to determine whether the rendering circuit is currently busy with (e.g.) texturing work, or arithmetic work, etc. The selection of which fragment work items (from which source) to issue next can thus be determined based on the current usage of the rendering circuit.

For instance, it would also be possible to characterise respective sets of primitives (e.g. draw calls), e.g. as being 'texture-heavy', 'arithmetic-heavy', etc., and to use this (static) characterisation of the primitives to select which fragment work items should be issued next. For example, fragment work items can be characterised appropriately based on the knowledge of the processing work (shader programs) that the fragment work items will undergo, e.g. as may be specified by the application programmer, or the compiler, etc. A set of fragment work items derived from a given set of primitives (e.g. a draw call) may thus have an associated descriptor indicative of this characterisation, and this descriptor can then be used when selecting which fragment work items to issue.

For example, on the basis of this characterisation, as well as the current utilisation of the respective functional units, the graphics processor may determine which fragment work items, from which source, to issue next accordingly (e.g. based on their characterisation as being 'texture' or 'arithmetic'-heavy), e.g. such that when the texturing units are currently busy, the graphics processor issues fragment work items from an 'arithmetic'-heavy source, and vice versa.

Thus, in embodiments, the graphics processor is able to track the current utilisation of the functional units within the rendering circuit. The graphics processor can then select the next fragment work items to issue based on the tracking of the current utilisation of the functional units within the rendering circuit.

For instance, based on which functional units are currently available (e.g. not fully utilised), the graphics processor may perform associative search (using descriptors) to determine whether the next fragment work item in a queue should be issued. If it is determined that the next fragment work item in the queue should not be issued, the graphics processor can then check another fragment work item in the (or a different) queue, and so on, and select an appropriate fragment work item in this way.

Similar consideration apply to fragment work items relating to, e.g., messaging operations (e.g. blits). Thus, in a similar fashion, by suitable characterisation of the fragment work items, can determine which is best to issue next in order to provide best utilisation of the currently available rendering resource.

Thus, in embodiments, the graphics processor is configured to monitor one or more conditions indicative of whether the fragment workload for a respective source of fragment work items is progressing, and when it is determined based on the one or more conditions that the fragment workload for a respective source of fragment work items is not progressing, the graphics processor is configured to start issuing fragment work items from another source of fragment work items.

The one or more conditions indicative of whether the fragment workload for a respective source of fragment work items is progressing may, for example, comprise at least one of: (i) the number of fragment work items from the source of fragment work items currently in the queues of fragment work items; (ii) the current utilisation of the functional units within the rendering circuit; and (iii) the current efficiency of a fragment culling operation for the source of fragment work items.

Other arrangements would of course be possible and the selection between the different sources of graphics fragments may be more or less sophisticated, as desired.

Subject to the requirements of the technology described herein, the graphics processor may include any other suitable and desired processing stages, etc., that a graphics processor may normally include.

The graphics processor in an embodiment executes a graphics processing pipeline and the graphics processing pipeline can contain any suitable and desired processing stages, etc. that a graphics processing pipeline may normally include.

For instance, and in an embodiment, when a sequence of primitives to be processed in the manner of the technology described herein is read into the graphics processing pipeline (which sequence of primitives may correspond to a particular processing task, e.g. rendering a single tile), each of the primitives in the sequence of primitives will initially be subjected to various primitive assembly operations (which may, and in embodiments do, include, e.g., vertex loading, primitive set-up, etc., operations).

In the case of a tile-based graphics processor, a tiling operation may then be performed to generate the respective tile-lists indicating which primitives should be rendered for which regions (e.g. tiles) of the render output. The tiling operation can be performed in any suitable manner, e.g. in the normal way for a tile-based graphics processor.

The assembled primitives may then be, and in an embodiment are, passed on to a rasteriser circuit in the next section of the graphics processing pipeline. The rasteriser circuit generates from the assembled primitives respective sets of one or more graphics fragments for rendering. The rasteriser (rasteriser circuit) can be configured to operate in any suitable and desired manner. For example, the rasteriser may generally operate to generate graphics fragments for processing in dependence upon which sampling points (or which sets of sampling points) of an array of sampling points covering the area of the render output, a given primitive, etc., received by the rasteriser covers (at least in part).

In embodiments, after the processing of the graphics primitives to generate fragments (by the rasteriser), the fragments may then be culled, e.g. by depth testing, etc., operations, in order to reduce number of fragments that are passed to the renderer circuit, e.g. to avoid unnecessary rendering.

The overall result of the primitive processing is therefore to generate a set of fragments that are to be rendered to generate the render output.

The rendering of a given primitive is then completed by shading the respective sets of fragments generated for the primitive to generate respective rendered fragment data for the render output.

As mentioned above, the rendering circuit in an embodiment comprises a programmable execution unit operable to execute fragment shader programs, and in which when executing a fragment shader program, the programmable execution unit executes the fragment shader program for respective groups of one or execution threads corresponding to respective fragment work items of a render output being generated.

Thus, when a set of one or more graphics fragments to be rendered is issued to the rendering circuit for rendering, a respective group (or groups) of one or more execution threads for executing a respective fragment shader program to generate rendered fragment data for the render output for the set of one or more graphics fragments is generated (spawned).

The group of one or more execution threads that is generated to execute a fragment shader program for a fragment work item can comprise as many execution threads as there are fragments in the set of fragments for the fragment work item. For instance, in an embodiment, the fragment work items correspond to a set of four (2×2) graphics fragments ("quads") and the group of execution threads may therefore comprise four execution threads. However, other arrangements would be possible.

In an embodiment, the graphics processor and the programmable execution unit is operable to execute shader programs for groups ("warps") of plural execution threads together, in lockstep, one instruction at a time.

The graphics processor may comprise a single programmable execution unit, or may have plural execution units. Where there are a plural execution units, each execution unit can, and in an embodiment does, in an embodiment operate in the manner of the technology described herein.

Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions.

In embodiments, as mentioned above, the execution unit includes (at least) a first set of functional units that are operable to perform (and in an embodiment dedicated for) texture processing operations and a second set of functional units that are operable to perform (and in an embodiment dedicated for) arithmetic processing operations.

The fragment shader program will comprise a sequence of instructions to be executed. The set (sequence) of instructions being executed for the program can be any desired and suitable instructions. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions).

When executing an instruction in a program, the execution unit (e.g. the appropriate functional unit, such as an arithmetic unit, of the execution unit) is in an embodiment configured to read one or more input data values (operands), perform a processing operation using those input data values to generate an output data value, and then return the output data value, e.g. for further processing by subsequent instructions in the program being executed and/or for output (for use otherwise than during execution of the program being executed).

The graphics processor in an embodiment also comprises any other appropriate and desired units and circuits required for the operation of the programmable execution unit(s), such as appropriate control circuits (control logic) for controlling the execution unit(s) to cause and to perform the desired and appropriate processing operations.

In addition to what has been described above, the graphics processing unit (processor) (processing pipeline) can include, and in an embodiment does include, any one or more, and in an embodiment all, of the processing stages that a graphics processor (processing pipeline) can normally include.

In particular, where the graphics processor is tile-based, graphics processor may also implement and execute a tiling pipeline for generating the primitive lists. Thus, whilst embodiments are described above in relation to the rendering of primitives to generate a given render output, which rendering is in an embodiment performed using a set of previously generated primitive lists, the graphics processor is in an embodiment also operable to perform (e.g. in an earlier processing pass) the tiling operations for generating the primitive lists.

Thus, in general, the graphics processor (processing pipeline) may also contain any other suitable and desired processing stages that a graphics processing pipeline may contain such as a hull shader, a tessellation stage (e.g. where tessellation is performed by executing a shader program), a domain (evaluation) shading stage (shader), a geometry shading stage (shader), a fragment shader, a blender, a write out unit etc.

In some embodiments, the graphics processor comprises, and/or is in communication with, one or more memories and/or memory devices that store the data described herein, such as the primitive data, the render output, etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, the various functional elements, stages, pipelines and "means" of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments will now be described with reference to the accompanying drawings in which.

FIG. 1 shows an exemplary computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into respective sets of one or more graphics fragments (fragment work items) for graphics rendering in turn. During a normal graphics rendering operation, the renderer will modify the (e.g.) colour (red, green and blue, RGB) and transparency (alpha, a) data associated with each set of fragments so that the fragments can be displayed correctly. Once the fragment work items have fully traversed the renderer, their associated data values are then stored in memory, ready for output, e.g. for display.

In the present embodiments, graphics processing is carried out in a pipelined fashion, with one or more pipeline stages operating on the data to generate the final render output, e.g. frame that is displayed.

Figure 2:
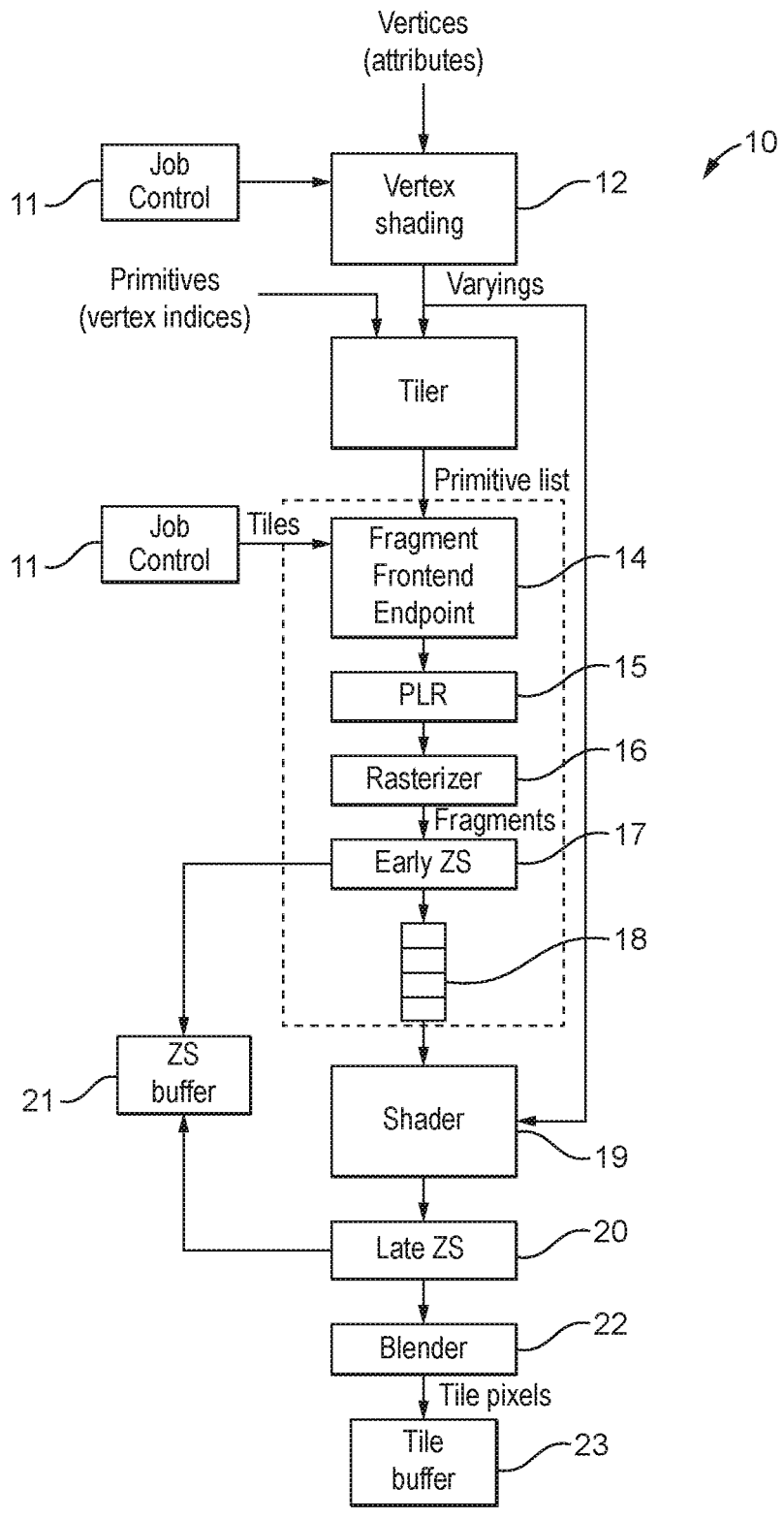
FIG. 2 shows schematically an example of a graphics processing pipeline being operated in a more conventional manner.

FIG. 2 shows an exemplary graphics processing pipeline 10 that may be executed by a graphics processor. The graphics processing pipeline 10 shown in FIG. 2 is a tile-based system, and will thus produce tiles of a render output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline according to the present embodiments. As will be appreciated by those skilled in the art, there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by an appropriate graphics processing unit (GPU) (graphics processor) that includes the necessary functional units, processing circuits, etc., operable to execute the graphics processing pipeline stages.

In order to control a graphics processor (graphics processing unit) that is implementing a graphics processing pipeline to perform the desired graphics processing operations, the graphics processor will typically receive commands and data from a driver, e.g. executing on a host processor, that indicates to the graphics processor the operations that it is to carry out and the data to be used for those operations.

As shown in FIG. 2, for an output to be generated, a set of vertices (with each vertex having one or more attributes, such as positions, colours, etc., associated with it) is provided to a vertex shading unit 12. A job controller 11 then causes the vertex shading unit 12 to process the input vertices, e.g. to transform the positions for the vertices from the, e.g. "world" space in which they are initially defined, to the, e.g. "screen", space that the output image is being generated in.

The graphics processor includes a tiler 13 for preparing primitive lists. The tiler in effect determines which primitives need to be processed for different regions of the render output. In the present embodiments, these regions may, e.g., represent a tile into which the overall render output has been divided into for processing purposes, or a set of multiple such tiles.

To do this, the tiler 13 receives the shaded vertices, as well as a set of indices referencing the vertices in the set of vertices, and primitive configuration information indicating how the vertex indices are to be assembled into primitives for processing when generating the output, and then compares the location of each primitive to be processed with the positions of the regions, and adds the primitive to a respective primitive list for each region that it determines the primitive could (potentially) fall within. Any suitable and desired technique for sorting and binning primitives into primitive lists, such as exact binning, or bounding box binning or anything in between, can be used for the tiling process.

The tiler 13 thus performs the process of "tiling" to allocate the assembled primitives to primitive lists for respective render output regions (areas) which are then used to identify the primitives that should be rendered for each tile that is to be rendered to generate the output data (which may, e.g. be a frame to be rendered for display). For example, the tiler 13 may be implemented using a primitive list building unit which takes the assembled primitives as its input, builds primitive lists using that data, and stores the primitive lists in memory.

Once the tiler 13 has completed the preparation of the primitive lists (lists of primitives to be processed for each region), then each tile can be rendered with reference to its associated primitive list(s).

To do this, each tile is processed by the graphics processing pipeline stages shown in FIG. 2.

The job controller 11 issues tiles into a primitive processing circuit of the graphics processing pipeline. As shown in FIG. 2, the primitive processing circuit includes a "fragment" frontend endpoint 14 that receives the tile to be processed and the primitive lists, which are then passed to a primitive list reader 15 (PLR) that determines which primitives need to be rendered for the tile in question.

A rasterisation stage (circuit) (rasteriser) 16 then takes as its input the primitives (including their vertices), from the primitive list(s) for the tile being rendered, rasterises the primitive to fragment work items, and provides the fragment work items to a fragment processing stage (circuit) 19, which in this embodiment comprises a shader execution engine (a shader core). The shader execution engine is a programmable execution unit that performs fragment shading by executing fragment shading software routines (programs) for fragments received from the rasteriser 16.

In this example the fragment work items generated by the rasteriser 16 are subject to (early) depth (Z)/stencil testing 17, to see if any fragment work items can be discarded (culled) at this stage. To do this, the Z/stencil testing stage 17 compares the depth values of (associated with) fragment work items issuing from the rasteriser 16 with the depth values of fragment work items that have already been rendered (these depth values are stored in a depth (Z) buffer 21) to determine whether the new fragment work items will be occluded by fragment work items that have already been rendered (or not). At the same time, an early stencil test is carried out.

Fragment work items that pass the fragment early Z and stencil test stage 17 may then be used for various further culling operations, such as a 'forward pixel kill' test, e.g. as described in United States Patent Application Publication No. 2019/0088009 (Arm Limited), before the remaining fragment work items are then passed to a fragment shading stage for rendering.

The fragment work items that survive the primitive processing are then queued 18 for input to the fragment processing stage (circuit) 10 (the fragment shader).

Each fragment work item will be processed by means of one or more execution threads which will execute the instructions of the shader program in question for the fragment work item in question. Typically, there will be multiple execution threads each executing at the same time (in parallel).

Other vertex attributes (varyings), such as colours, transparency, etc., that are needed will be fetched (and as necessary "vertex shaded") as part of the fragment shading processing.

After the fragment shading is performed, a late depth/stencil text 20 may then be performed.

After this, the output of the fragment processing (the rendered fragment work items) is then subject to any desired post-processing, such as blending (in blender 22), and then written out to a tile buffer 23. Once the processing for the tile in question has been completed, then the tile will be written to an output data array in memory, and the next tile processed, and so on, until the complete output data array has been generated. The process will then move on to the next output data array (e.g. frame), and so on.

The output data array may typically be an image for a frame intended for display on a display device, such as a screen or printer, but may also, for example, comprise intermediate render data intended for use in later rendering passes (also known as a "render to texture" output), etc.

Other arrangements would of course be possible.

Figure 3:
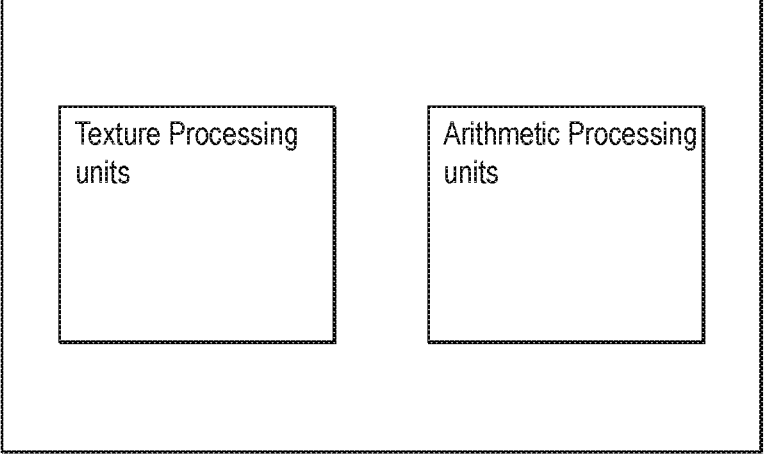
FIG. 3 shows in more detail the fragment processing unit (shader)

FIG. 3 shows the fragment processing stage (circuit) 19 in more detail. In particular, as shown in FIG. 3, the fragment processing stage (circuit) 19 comprises respective functional units that are dedicated either for performing texture operations (such as texture loads, varying interpolations, etc.) or for performing arithmetic operations (e.g. using the loaded textures).

The technology described herein has recognised that for typical fragment processing workloads, it is often the case that many of the execution threads spawned at a particular time will want to perform the same operations, e.g. such that a large number of execution threads are busy performing texture operations. In conventional graphics processors the fragment processing workload is often also highly serialised such that the next phase of the workload cannot start until the texture operations have finished. This means that in more conventional graphic processor operation there may be instances where, e.g., all of the texture processing units are busy, whereas the arithmetic processing units are forced to be idle, and vice versa.

Figure 4:
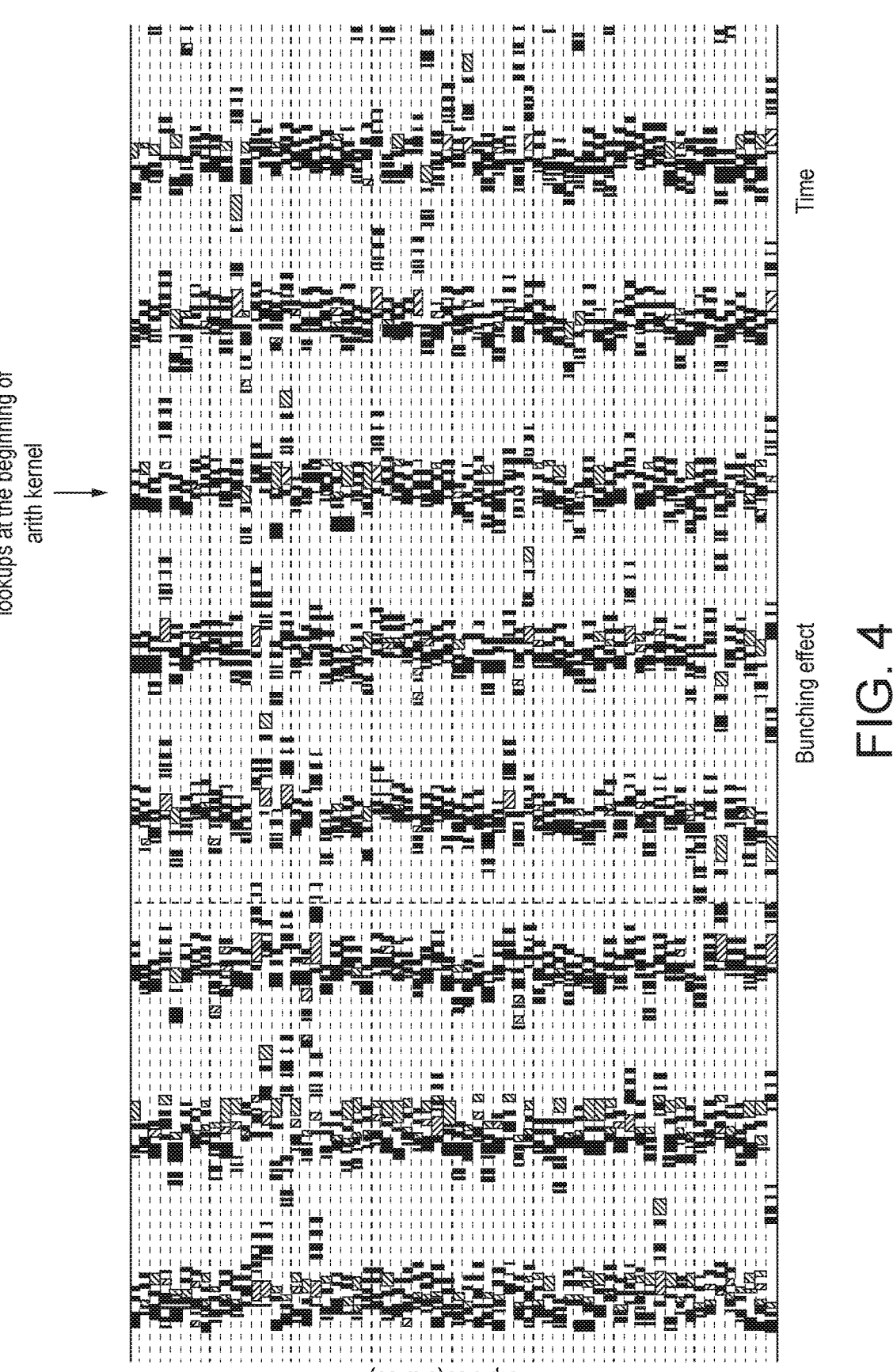
FIG. 4 illustrates a bunching effect that may be observed in more conventional graphics processing pipelines.

Thus, in conventional graphics processor, a 'bunching' effect can be observed, where the overall fragment processing workload contains a number of distinct processing peaks. For example, the fragment processing workload may include a number of synchronisation events, such as (tile) boundaries, and barriers, etc., that result in this behaviour, e.g. where each synchronisation event triggers a larger number of texture operations to be performed at the same time. This effect is illustrated in FIG. 4. It can be seen from FIG. 4 that the highly serialised nature of the fragment processing workload can therefore result in a poor average utilisation of the rendering circuit, e.g., as at any instance, a significant number of functional units (e.g. either the texture processing units or the arithmetic processing units) may be idle waiting on a previous phase of work to complete.

The present embodiments thus aim to provide a more uniform fragment processing workload, to thereby improve the average utilisation of the rendering circuit, and hence improve rendering speed. To do this, rather than issuing fragment work items for each tile in sequence, the present embodiments interleave fragment processing work for multiple different regions of the tiles.

Figure 5:
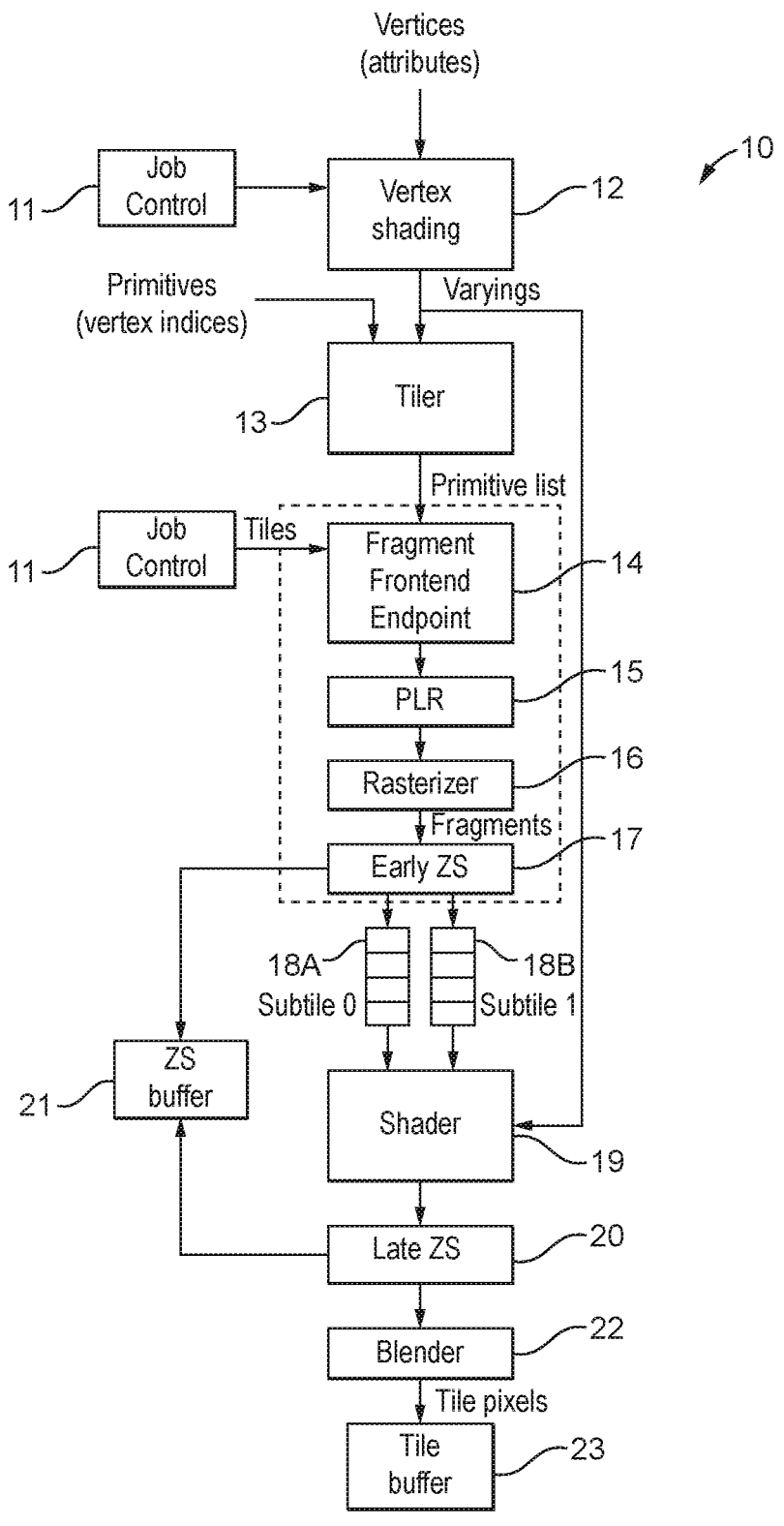
FIG. 5 shows schematically an example of a graphics processing pipeline being operated according to an embodiment.
Figures 6, 7:
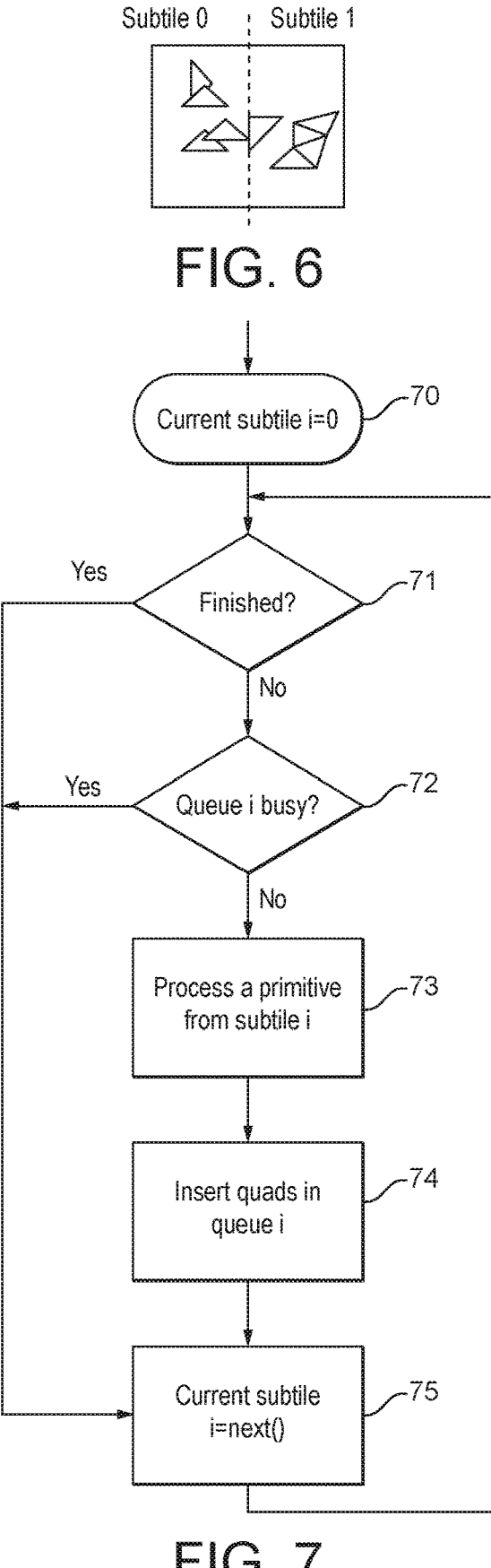
FIG. 6 shows schematically the division of a tile into respective sub-tiles for rendering.
FIG. 7 is a flow chart illustrating a method according to an embodiment.

FIG. 5 shows an embodiment of this. The graphics processor in FIG. 5 is similar to that described above in relation to FIG. 2. However, in this embodiment, rather than rendering each tile in its entirety, the tiles are sub-divided into sub-tiles (as shown in FIG. 6). The sub-tiles are processed in an interleaved manner in the primitive processing circuit, e.g. in a similar fashion as described above, except that in the final stage of the primitive processing circuit, the graphics fragments are provided into two separate queues 18A, 18B, with each queue corresponding to a respective one of the sub-tiles.

FIG. 7 shows an example of how the queues 18A, 18B can be populated in an embodiment.

Starting at the first sub-tile (step 70), it is first checked whether the processing for that sub-tile is finished (step 71). If the processing is finished, the graphics processor can then move to the next sub-tile (the next queue) (step 75). On the other hand, if the processing has not finished, it is then checked whether or not the associated queue for the sub-tile is suitable progressing. For example, when it is determined that the queue 'busy', e.g., on the basis that the number of fragment work items in the queue has exceeded a threshold value (step 72), the graphics processor can switch to the next sub-tile.

Otherwise if the processing has not finished, and the queue is not busy, a primitive (or draw call) from the first sub-tile is selected for processing, and processed into respective fragment work items which are then inserted into the respective queue. This is then repeated to generate respective queues for the different sub-tiles.

Once the queues 18A, 18B have been generated, the fragment work items can then be issued to the fragment processing stage 10 (the fragment shader) from the different queues 18A, 18B in an interleaved fashion, e.g. as will be described below. The sub-tiles thus effectively act as separate, essentially independent, "sources" of graphics fragments, from which fragment work items can be selectively and, e.g., alternately issued to the fragment processing stage 10 (the fragment shader).

Figure 8:
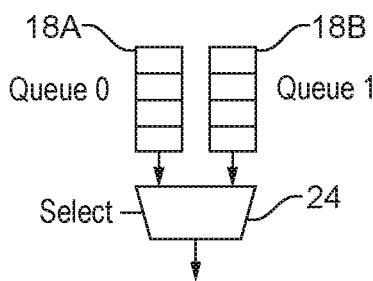
FIG. 8 shows a selection unit for selecting between different queues of graphics fragments according to an embodiment.

Thus, as shown in FIG. 8, a selection circuit 24 may be provided that is operable to select from which queue (source) of graphics fragments 18A, 18B the next fragment work items should come from, and to interleave the fragment processing (shading) work accordingly.

By alternating between the different sources of graphics fragments (the different sub-tiles) it is thus possible to effectively delay the start of the processing work for one of the sources (sub-tiles) relative to the other. In this way, the expected processing peaks for one of the sources (sub-tiles) (e.g. as shown in FIG. 4) can be shifted out of phase with the peaks for the other source (sub-tile), to thereby provide a more uniform overall workload.

Figure 9:
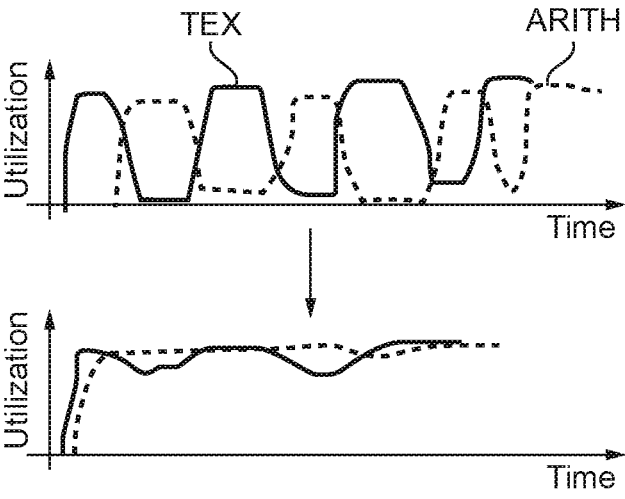
FIG. 9 illustrates an improvement according to an embodiment.

FIG. 9 illustrates the improvement that is possible in this way, with the upper panel showing the peaks in the texture and arithmetic processing workloads when the graphics processor is operated in a more conventional manner, and the lower panel showing the improved average utilisation that can be achieved by the present embodiment.

The fragment processing (shading) work can be interleaved in any suitable manner, as desired.

In some embodiments the switching between the different sources (queues) of graphics fragments 18A, 18B is performed in an essentially workload-independent manner, e.g., and in an embodiment, by the selection circuit 24 alternately selecting graphics fragments from the different queues, e.g. in a round robin fashion.

For example, in a simple case, the selection circuit 24 may be configured to alternate on a per draw call basis, e.g. such that a first draw call is processed for the first sub-tile, the first draw call is then processed for the second sub-tile, followed by a second draw call for the first sub-tile, and so on.

In other embodiments the graphics processor is configured to select between the different sources (queues) of graphics fragments in a more dynamic, or intelligent (workload-dependent) manner. For example, by monitoring the actual workload and/or utilisation of the fragment processing stage 10 (the fragment shader), and then selecting which fragment work items to issue accordingly, the graphics processor can try to optimise the workload.

Figure 10:
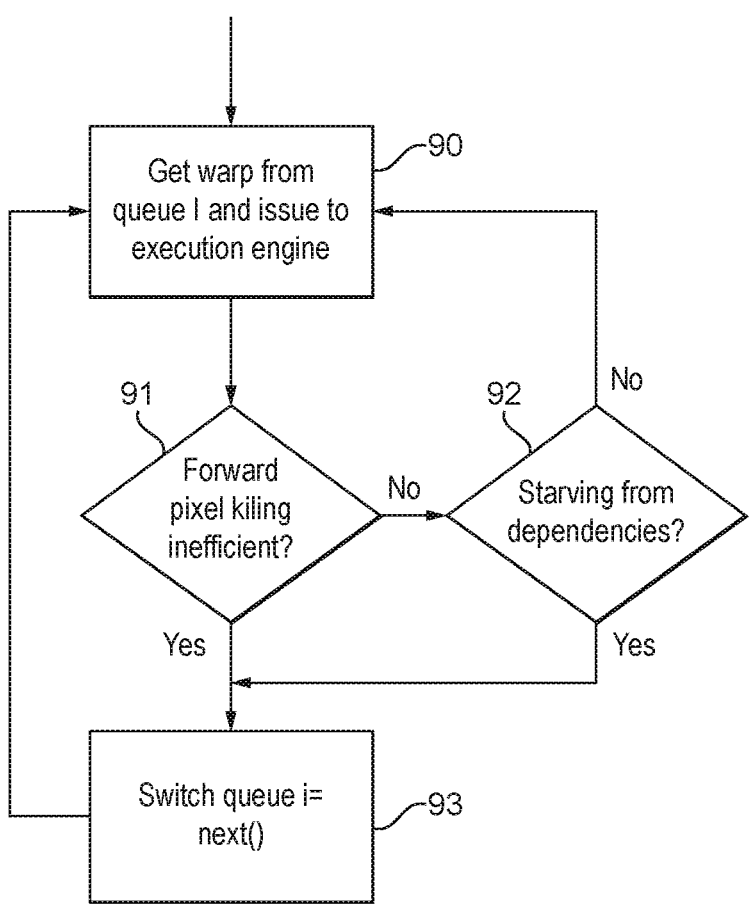
FIG. 10 is a flow chart illustrating a method according to another embodiment.
Figure 11:
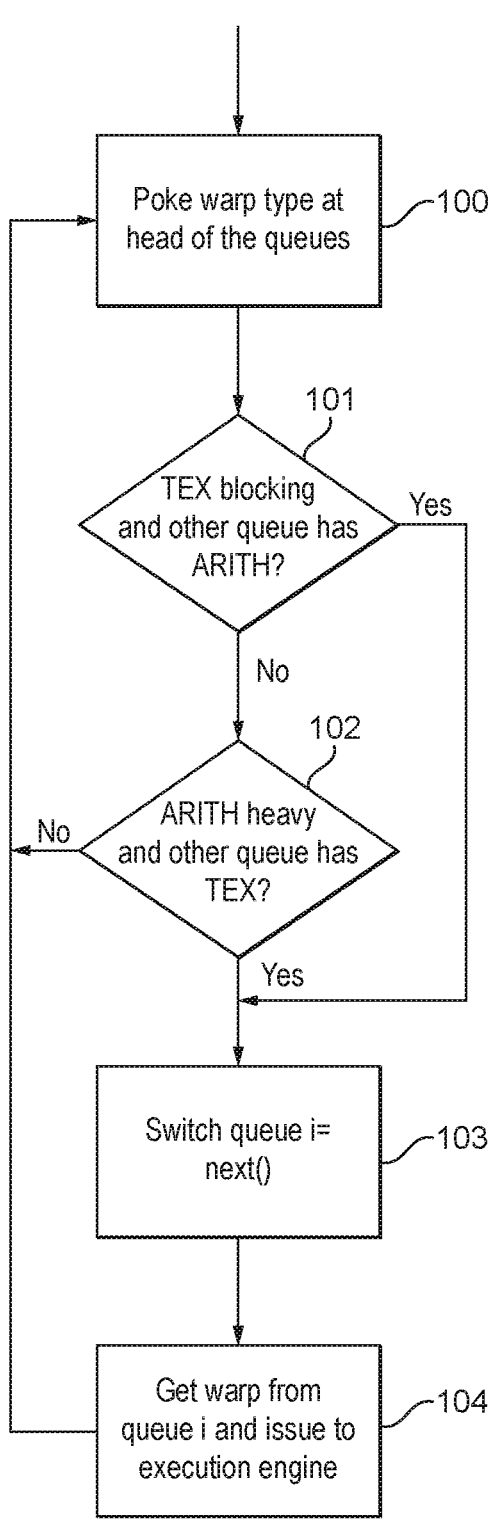
FIG. 11 is a flow chart illustrating a method according to another embodiment.

FIG. 10 shows an embodiment of this. In FIG. 10, the rendered fragment work items are used for various (early) culling operations, such as a 'forward pixel kill' test, e.g. as described in United States Patent Application Publication No. 2019/0088009 (Arm Limited).

In this embodiment, the graphics processor is arranged to spawn an execution thread group for a fragment work item from the current queue and issue the execution thread group to the fragment processing stage 10 (the fragment shader) (execution unit) for execution (step 90).

It is then checked whether the (early) culling operation is being performed in an efficient manner (step 91). For example, if the fragment workload is not suitably progressing, there may be relatively few rendered fragment work items that can be used for the culling. In that case, when it is determined that the culling operation is not effective (step 91—yes), the graphics processor can switch to the next queue appropriately (step 93).

In a similar fashion, when the rendering operation is being 'starved' from dependencies, e.g. because there are a number of outstanding (unmet) dependencies that mean the fragment processing workload for the queue is not progressing (step 92—yes), the graphics processor can switch to the next queue appropriately (step 93).

Otherwise, so long as the (early) culling operation remains effective (step 91—no) and there are no dependencies stalling the progress of the queue (step 91—no), the graphics processor continues issuing fragment work items from the current queue (step 90).

In this embodiment the graphics processor is thus able to track one or more conditions that indicate the current progression of the fragment workloads and to select between queues appropriately on this basis.

It would also be possible to characterise draw calls as being arithmetic or texture heavy. In that case, as shown in FIG. 10, the fragment work item at the head of each queue can be checked ('poked') to determine whether the execution thread for the fragment work item is arithmetic or texture heavy (step 100). This characterisation can then be compared with runtime performance counters indicating if texture processing is at the peak (e.g. back pressure to execution engine) or arithmetic processing is at the peak, and it can thus be determined which queue to extract from based on this information.

For example, when it is determined that the texture processing units are currently busy, and the execution thread for the fragment work item at the head of the other queue is characterised as being arithmetic heavy (step 101—yes), the graphics processor can then switch to the other queue accordingly (step 103), such that the arithmetic heavy execution thread for the fragment work item at the head of the other queue is then issued to the fragment processing stage 10 (the fragment shader) (execution unit) for execution (step 104).

Correspondingly, when the current workload is arithmetic heavy, and the execution thread for the fragment work item at the head of the other queue is characterised as being texture heavy (step 102—yes), the graphics processor can again switch queues (step 103).

Otherwise, the graphics processor can continue to issue fragment work items from the current queue (step 102—no).

Similarly, instead of, or as well as, considering static characterisations of draw calls as being arithmetic or texture heavy, the selection could also be based on whether the execution thread groups are arithmetic or 'blit' heavy (with blit-heavy execution threads doing, e.g., two or three, messaging operations that occupy execution thread group slots without being able to utilise arithmetic units during their lifetime). This is illustrated in FIG. 12.

Figure 12:
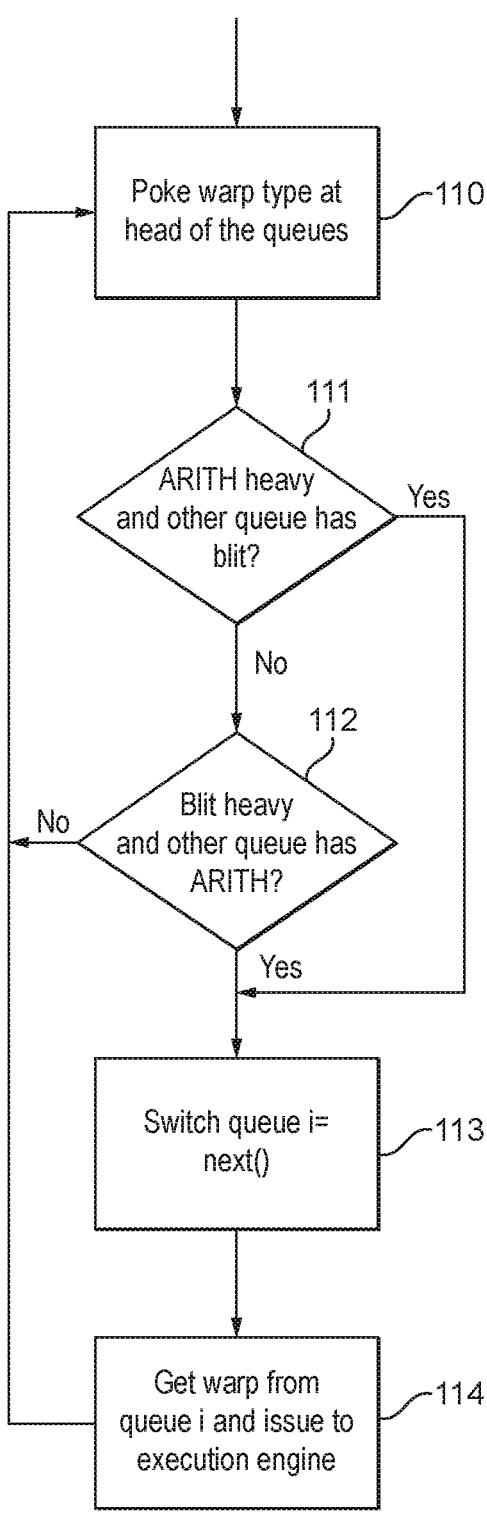
FIG. 12 is a flow chart illustrating a method according to another embodiment.

In FIG. 12, the fragment work item at the head of each queue can be checked ('poked') to determine whether the execution thread for the fragment work item is arithmetic or 'blit' heavy (step 110). If the current fragment processing workload is arithmetic heavy and the execution thread for the fragment work item at the head of the other queue is characterised as a 'bit' operation (step 111—yes), the graphics processor can then switch queues (step 113), such that the blit operation is issued appropriately (whilst the arithmetic operations for the previous queue are finishing).

Correspondingly, when the current workload is blit heavy, and the execution thread for the fragment work item at the head of the other queue is characterised as being arithmetic heavy (step 112—yes), the graphics processor can again switch queues (step 113).

Otherwise, the graphics processor can continue to issue fragment work items from the current queue (step 112—no).

Figure 13:
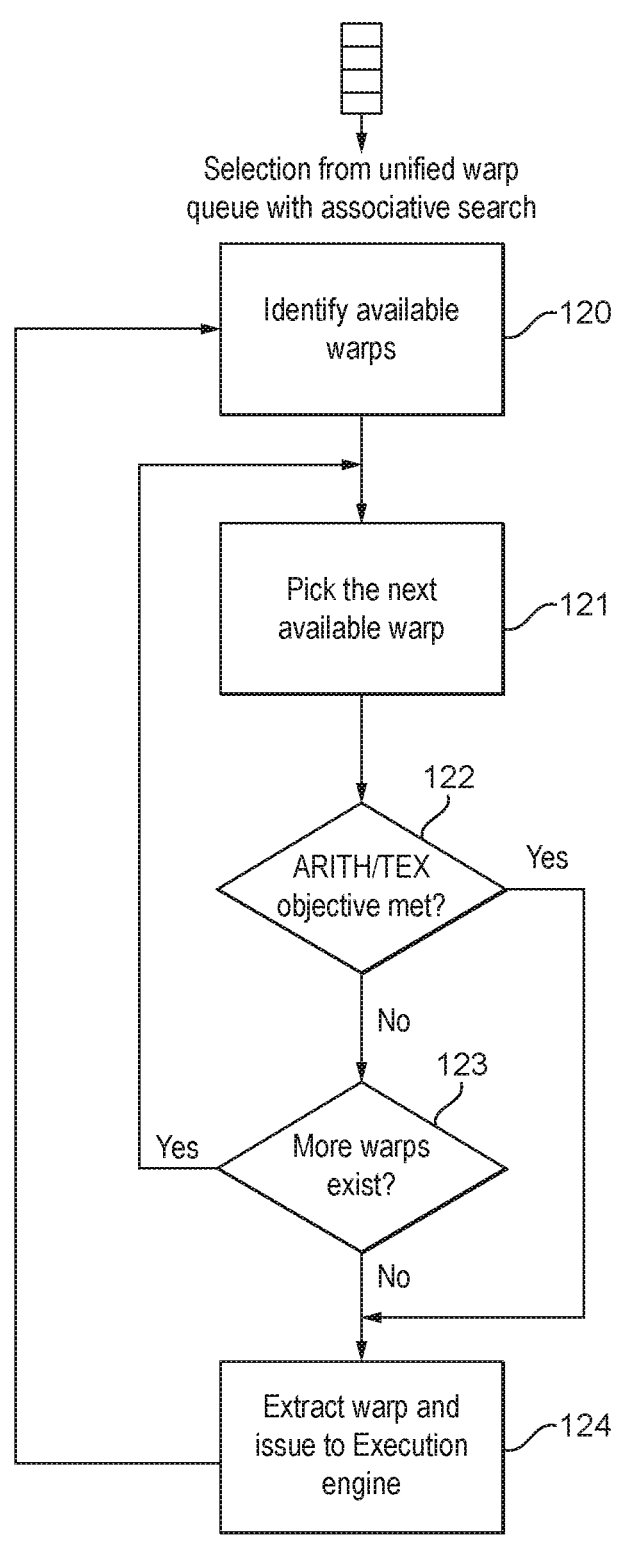
FIG. 13 is a flow chart illustrating a method according to another embodiment.

In the examples above the graphics processor is configured to generate respective, different queues of fragments for the two different sources of graphics fragments (sub-tiles) and to select from these queues appropriately. However, there could also be a single queue of fragments that itself contains fragments from different sources. FIG. 13 shows an example of a single queue scheme. In this embodiment, the execution thread groups spawned for the fragment work items are placed in the single queue. Based on runtime performance counters and static characterization of warps, associative lookup can be performed on the available execution thread groups for the fragment work items in the queue to determine which fragment work items to issue to the execution engine.

Thus, in FIG. 13, the graphics processor is arranged to first identify the available execution thread groups (warps) (step 120). The graphics processor can then pick the next available thread group (warp), e.g. at the head of the queue (step 121). According to whether that thread group (warp) is arithmetic or texture heavy, it can then be determined whether a certain arithmetic/texture objective is being met (step 122). For example, when the thread group (warp) is texture heavy, and the texture units are not being fully utilised, the texture objection may be considered met (step 122—yes), and the thread group (warp) can then be extracted and issued to the execution engine accordingly (step 124).

On the other hand, when the arithmetic/texture objective is not being met, e.g. since the texture units are currently busy, rather than issuing a texture heavy thread group (step 122—no) it is checked whether any other thread groups (warp) are present in the queue (step 123—no) and the next available thread group (warp) in the queue is then processed in the same way. If there are no other thread groups (warps) in the queue (step 123—no) the thread group (warp) is anyway issued for execution, as it anyway needs to be executed.

In the embodiments described above the queues of fragment work items are provided immediately before the fragment processing stage 10 (the fragment shader) (execution unit), to minimise parallel processing. However, it would also be possible to divide the processing for the different sources of fragment work items at an earlier stage.

Figure 14:
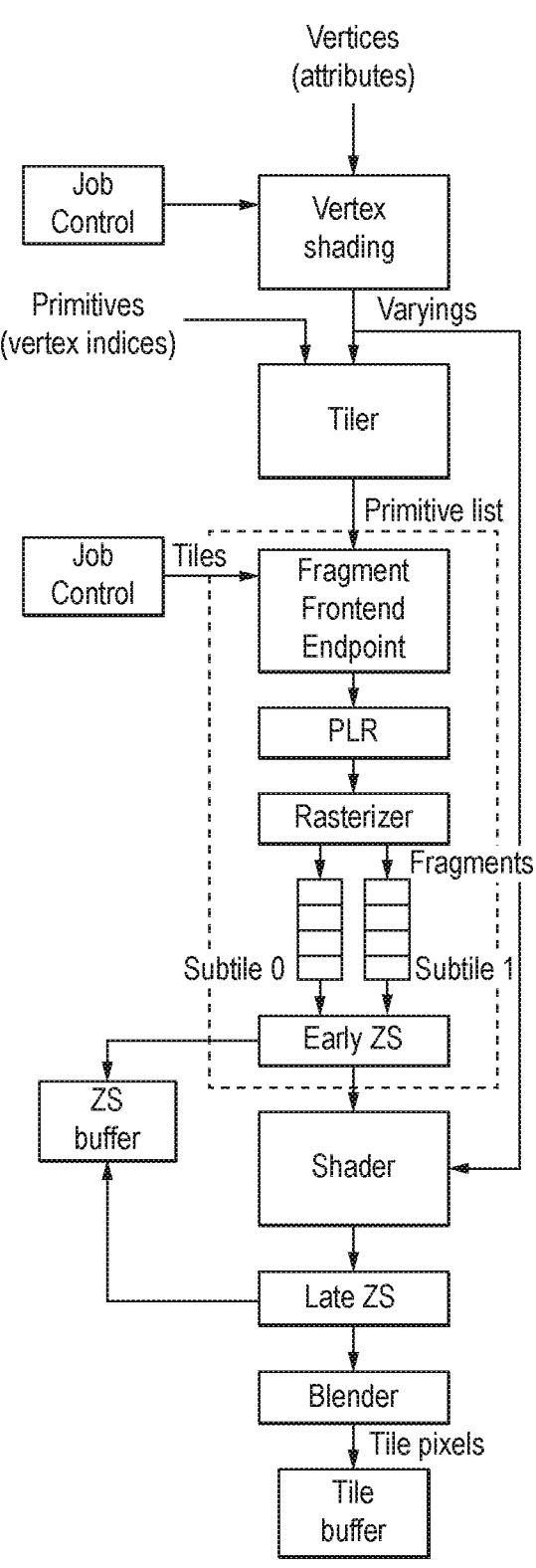
FIG. 14 shows schematically another example of a graphics processing pipeline being operated according to an embodiment.

For example, in FIG. 14, the queues are generated directly after the rasterisation stage. In that case the early depth and/or stencil testing can be performed in an interleaved fashion.

Figure 15:
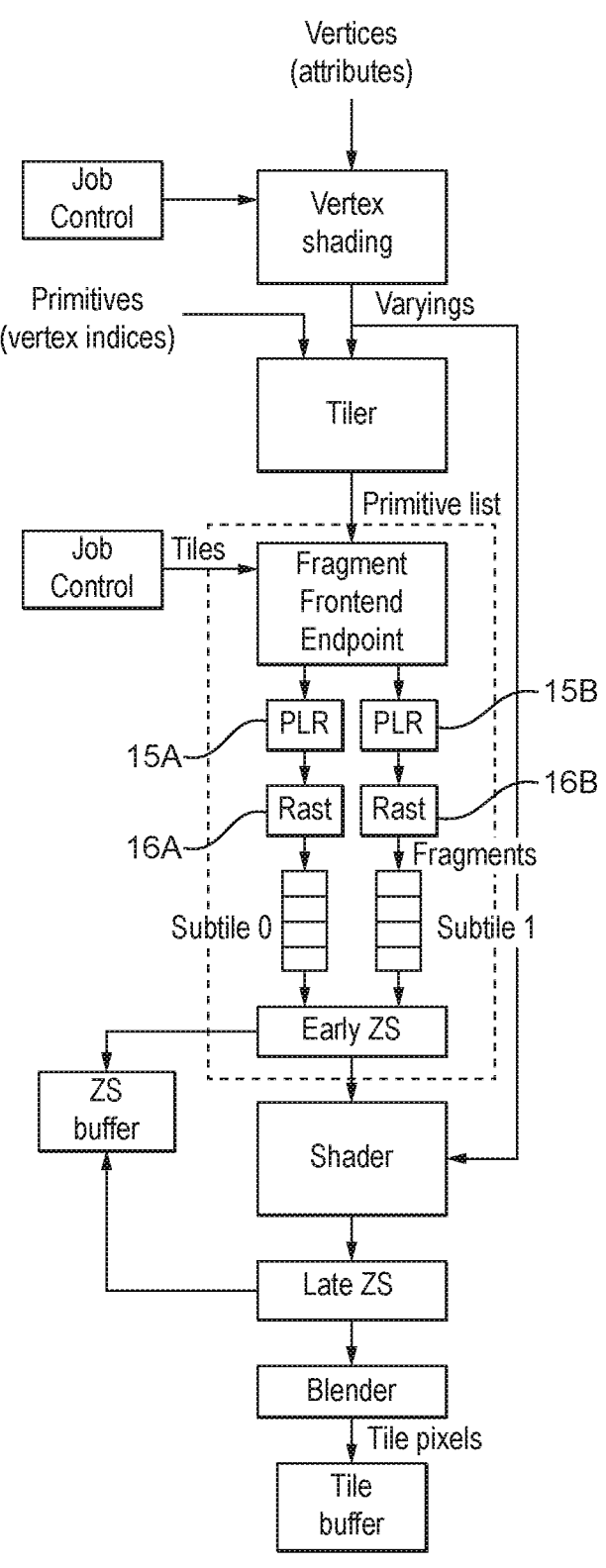
FIG. 15 shows schematically another example of a graphics processing pipeline being operated according to an embodiment.

As another example, in the embodiment shown in FIG. 15, all of the primitive processing after the fragment frontend endpoint is performed in parallel. In that case there are two parallel primitive processing pipelines, with respective primitive list readers 15A, 15B (PLR) and rasterisation units (16A, 16B) that populate the respective queues. The fragment frontend endpoint can thus be configured to issue primitives for the different sources to the respective primitive processing pipeline in order to generate the corresponding queues.

Various other arrangements would be possible in this regard.

Although in the examples described above the different sources correspond to different sub-tiles, it will be appreciated that other suitable divisions of the render output could also be used to generate independent sources of graphics fragments. For example, the different sources may correspond to different rendering tiles themselves (rather than sub-tiles). Various other arrangements would be possible for providing different sources of graphics fragments that can be processed in the manner described above.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A graphics processor comprising:
a primitive processing circuit operable to process graphics primitives into respective fragment work items to be rendered, wherein the primitive processing circuit is configured to generate one or more queues of fragment work items for rendering, wherein the one or more queues of fragment work items contain fragment work items corresponding to multiple, different sources of fragment work items; and
a rendering circuit for rendering respective fragment work items generated by the primitive processing circuit,
wherein the graphics processor is configured to issue fragment work items from the one or more queues of fragment work items generated by the primitive processing circuit to the rendering circuit for rendering so that fragment work items from the different sources of fragment work items can be issued to the rendering circuit in an interleaved fashion, wherein rendering of fragment work items from a first source of fragment work items can thereby be interleaved with rendering of fragment work items from a second source of fragment work items,
wherein the graphics processor is configured to perform tile-based rendering, wherein a render output to be generated is sub-divided into a plurality of tiles for rendering, each tile corresponding to a respective region of the render output that is being generated, and
wherein the different sources of fragment work items correspond to different tiles, or sub-divisions of tiles, of a same render output that is being generated so that the rendering of fragment work items from different tiles, or sub-divisions of tiles, of the same render output is interleaved.

2. The graphics processor of claim 1, wherein the primitive processing circuit is configured to process input primitives into respective sets of fragment work items in a serial fashion, and wherein the graphics processor is configured to interleave the processing of primitives from the multiple different sources of fragment work items in the primitive processing circuit, with the resulting fragment work items generated by the primitive processing then being inserted into the one or more queues of fragment work items.

3. The graphics processor of claim 2, wherein the primitive processing circuit is configured to insert the fragment work items from the respective different sources of fragment work items into a corresponding plurality of different queues, with each queue corresponding to a different source of fragment work items.

4. The graphics processor of claim 1, wherein the primitive processing circuit is configured to process primitives from multiple different sources of fragment work items in parallel to generate plural queues of fragment work items for rendering, each queue corresponding to one or more respective sources of fragment work items.

5. The graphics processor of claim 1, wherein the graphics processor is configured to repeatedly switch between the different sources of fragment work items according to a predetermined schedule.

6. The graphics processor of claim 5, wherein the graphics processor is configured to alternate between the different sources of fragment work items on a per draw call basis.

7. The graphics processor of claim 1, wherein the graphics processor is configured to monitor one or more conditions indicative of whether the fragment workload for a respective source of fragment work items is progressing, and when it is determined based on the one or more conditions that the fragment workload for a respective source of fragment work items is not progressing, the graphics processor is configured to start issuing fragment work items from another source of fragment work items.

8. A graphics processor comprising:

a primitive processing circuit operable to process graphics primitives into respective fragment work items to be rendered, wherein the primitive processing circuit is configured to generate one or more queues of fragment work items for rendering, wherein the one or more queues of fragment work items contain fragment work items corresponding to multiple, different sources of fragment work items; and a rendering circuit for rendering respective fragment work items generated by the primitive processing circuit, wherein the graphics processor is configured to issue fragment work items from the one or more queues of fragment work items generated by the primitive processing circuit to the rendering circuit for rendering so that fragment work items from the different sources of fragment work items can be issued to the rendering circuit in an interleaved fashion, wherein rendering of fragment work items from a first source of fragment work items can thereby be interleaved with rendering of fragment work items from a second source of fragment work items, wherein the graphics processor is configured to monitor one or more conditions indicative of whether the fragment workload for a respective source of fragment work items is progressing, and when it is determined based on the one or more conditions that the fragment workload for a respective source of fragment work items is not progressing, the graphics processor is configured to start issuing fragment work items from another source of fragment work items.

9. The graphics processor of claim 8, wherein the one or more conditions indicative of whether the fragment workload for a respective source of fragment work items is progressing comprise at least one of: (i) the number of fragment work items from the source of fragment work items currently in the queues of fragment work items; (ii) the current utilisation of the functional units within the rendering circuit; and (iii) the current efficiency of a fragment culling operation for the source of fragment work items.

10. The graphics processor of claim 8, wherein the graphics processor is configured to perform runtime monitoring to determine the current utilisation of the rendering circuit, and to selectively issue fragment work items from one or other of the sources of graphics fragments based on the determined current utilisation of the rendering circuit.

11. The graphics processor of claim 8, wherein the different sources of fragment work items correspond to different regions of a render output that is being generated.

12. The graphics processor of claim 8, wherein the different sources of fragment work items correspond to different render outputs being generated.

13. The graphics processor of claim 12, wherein the graphics processor is configured to perform runtime monitoring to determine the current utilisation of the rendering circuit, and to selectively issue fragment work items from one or other of the sources of graphics fragments based on the determined current utilisation of the rendering circuit.

14. A method of operating a graphics processor, wherein the graphics processor comprises:

a primitive processing circuit operable to process graphics primitives into respective sets of graphics fragments to be rendered; and a rendering circuit for rendering respective fragment work items provided by the primitive processing circuit;

the method comprising:

the primitive processing circuit generating one or more queues of fragment work items for rendering, wherein the one or more queues of fragment work items contain fragment work items corresponding to multiple, different sources of fragment work items; and the graphics processor issuing fragment work items from the one or more queues of fragment work items generated by the primitive processing circuit to the rendering circuit for rendering so that fragment work items from the different sources of fragment work items are issued to the rendering circuit in an interleaved fashion, whereby rendering of fragment work items from a first source of fragment work items is thereby interleaved with rendering of fragment work items from a second source of fragment work items, wherein the graphics processor is configured to perform tile-based rendering, wherein a render output to be generated is sub-divided into a plurality of tiles for rendering, each tile corresponding to a respective region of the render output that is being generated, and wherein the different sources of fragment work items correspond to different tiles, or sub-divisions of tiles, of a same render output that is being generated so that the rendering of fragment work items from different tiles, or sub-divisions of tiles, of the same render output is interleaved.

15. The method of claim 14, comprising the primitive processing circuit processing input primitives into respective sets of fragment work items in a serial fashion, and the graphics processor interleaving the processing of primitives from the multiple different sources of fragment work items in the primitive processing circuit, with the resulting fragment work items generated by the primitive processing then being inserted into the one or more queues of fragment work items.

16. The method of claim 15, comprising inserting fragment work items from the respective different sources of fragment work items into a corresponding plurality of different queues, with each queue corresponding to a different source of fragment work items.

17. The method of claim 14, comprising the primitive processing circuit processing primitives from multiple different sources of fragment work items in parallel to generate plural queues of fragment work items for rendering, each queue corresponding to one or more respective sources of fragment work items.

18. The method of claim 14, comprising the graphics processor repeatedly switching between the different sources of fragment work items according to a predetermined schedule, the graphics processor alternating between the different sources of fragment work items on a per draw call basis.

19. The method of claim 14, comprising monitoring one or more conditions indicative of whether the fragment workload for a respective source of fragment work items is progressing, and when it is determined based on the one or more conditions that the fragment workload for a respective source of fragment work items is not progressing, the graphics processor issuing fragment work items from another source of fragment work items.

20. The method of claim 19, wherein the one or more conditions indicative of whether the fragment workload for a respective source of fragment work items is progressing comprise at least one of: (i) the number of fragment work items from the source of fragment work items currently in the queues of fragment work items; (ii) the current utilisation of the functional units within the rendering circuit; and (iii) the current efficiency of a fragment culling operation for the source of fragment work items; or wherein the graphics processor is configured to perform runtime monitoring to determine the current utilisation of the rendering circuit, and to selectively issue fragment work items from one or other of the sources of graphics fragments based on the determined current utilisation of the rendering circuit.

\* \* \* \* \*